(12) United States Patent
Germano et al.

(10) Patent No.: US 12,703,231 B2
(45) Date of Patent: Aug. 11, 2026

(54) TONNEAU COVER SYSTEM

(71) Applicant: Extang Corporation, Ann Arbor, MI (US)

(72) Inventors: David Guerino Germano, Ann Arbor, MI (US); Joseph Thomas Brophy, Rockford, MI (US); Joseph David Fairbairn, Novi, MI (US); Ryan DeLong, Stockbridge, MI (US); Dustin Michael Campbell, Livonia, MI (US); Kenneth Jay Hall, Jackson, MI (US); Mark Alan Hickey, Howell, MI (US)

( * ) Notice: Subject to any disclaimer, the term of this patent is extended or adjusted under 35 U.S.C. 154(b) by 415 days.

(21) Appl. No.: 18/376,055

(22) Filed: Oct. 3, 2023

(65) Prior Publication Data

US 2024/0157774 A1 May 16, 2024

Related U.S. Application Data

(60) Provisional application No. 63/425,034, filed on Nov. 14, 2022.

(51) Int. Cl.

*B60J 7/10* (2006.01)
*B60J 7/14* (2006.01)
*B60J 7/19* (2006.01)

(52) U.S. Cl.

CPC ................. *B60J 7/102* (2013.01); *B60J 7/10* (2013.01); *B60J 7/141* (2013.01); *B60J 7/198* (2013.01); *B60Y 2200/14* (2013.01); *B60Y 2304/07* (2013.01)

(58) Field of Classification Search

CPC .................................... B60J 7/10; B60J 7/102
USPC ........................... 296/100.11, 100.12, 100.18
See application file for complete search history.

(56) References Cited

U.S. PATENT DOCUMENTS

| | | | | |
|---|---|---|---|---|
| 5,480,206 | A | 1/1996 | Hathaway et al. | |
| 5,511,843 | A * | 4/1996 | Isler | B60J 7/104 296/100.17 |
| 6,053,558 | A | 4/2000 | Weddy et al. | |
| 6,257,306 | B1 * | 7/2001 | Weldy | B60J 7/102 296/100.18 |
| 6,257,647 | B1 | 7/2001 | Ninness et al. | |
| 6,543,836 | B1 * | 4/2003 | Wheatley | B60J 7/102 296/100.18 |
| 8,480,206 | B2 | 7/2013 | Murray | |
| 8,960,765 | B2 | 2/2015 | Facchinello et al. | |
| 9,346,344 | B2 * | 5/2016 | Smith | B60P 7/02 |

(Continued)

OTHER PUBLICATIONS

Written Opinion of the International Searching Authority dated May 22, 2025.

(Continued)

*Primary Examiner* — Jason S Morrow

(57) ABSTRACT

A cover system configured for a cargo area of a vehicle, the cover system includes a frame having a first frame section and a second frame section that opposes the first frame section; a bow connector connected to the first frame section; and a bow that extends between the first frame section and the second frame section, the bow includes a receiver that is configured to engage the bow connector to connect the bow to the first frame section; the bow connector includes a wedge-shaped structure that is configured to engage a corresponding wedge-shaped structure on the receiver of the bow to connect the bow to the first frame section.

17 Claims, 19 Drawing Sheets

(56) References Cited

U.S. PATENT DOCUMENTS

| | | | | |
|---|---|---|---|---|
| 10,414,254 | B2 | 9/2019 | Zheng et al. | |
| 11,014,436 | B1 * | 5/2021 | Zheng | B60J 7/198 |
| 11,186,150 | B2 * | 11/2021 | Cao | B60J 7/185 |
| 11,331,989 | B2 | 5/2022 | Lutzka et al. | |
| 11,427,064 | B2 * | 8/2022 | Xu | B60J 10/90 |
| 11,518,223 | B2 * | 12/2022 | Potter | B60J 7/102 |
| 11,993,138 | B2 * | 5/2024 | Shen | B60J 7/1607 |
| 2004/0119314 | A1 | 6/2004 | Haack et al. | |
| 2010/0133872 | A1 * | 6/2010 | Kosinski | B60J 7/104 296/100.09 |
| 2013/0161974 | A1 * | 6/2013 | Williamson | B60P 7/04 403/322.4 |
| 2015/0102629 | A1 * | 4/2015 | Potter | B60P 7/0876 296/100.16 |
| 2016/0107515 | A1 | 4/2016 | Shi et al. | |
| 2019/0084388 | A1 | 3/2019 | Zheng | |
| 2020/0094660 | A1 * | 3/2020 | Ma | B60J 7/185 |
| 2020/0164732 | A1 * | 5/2020 | Smith | F16B 7/044 |

OTHER PUBLICATIONS

International Search Report and Written Opinion dated Feb. 22, 2024, for International Application PCT/US2023/078025.

* cited by examiner

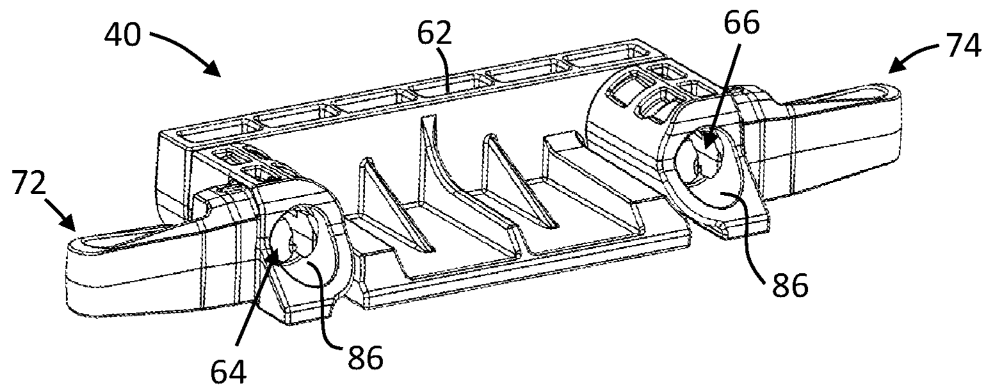
Fig. 5A
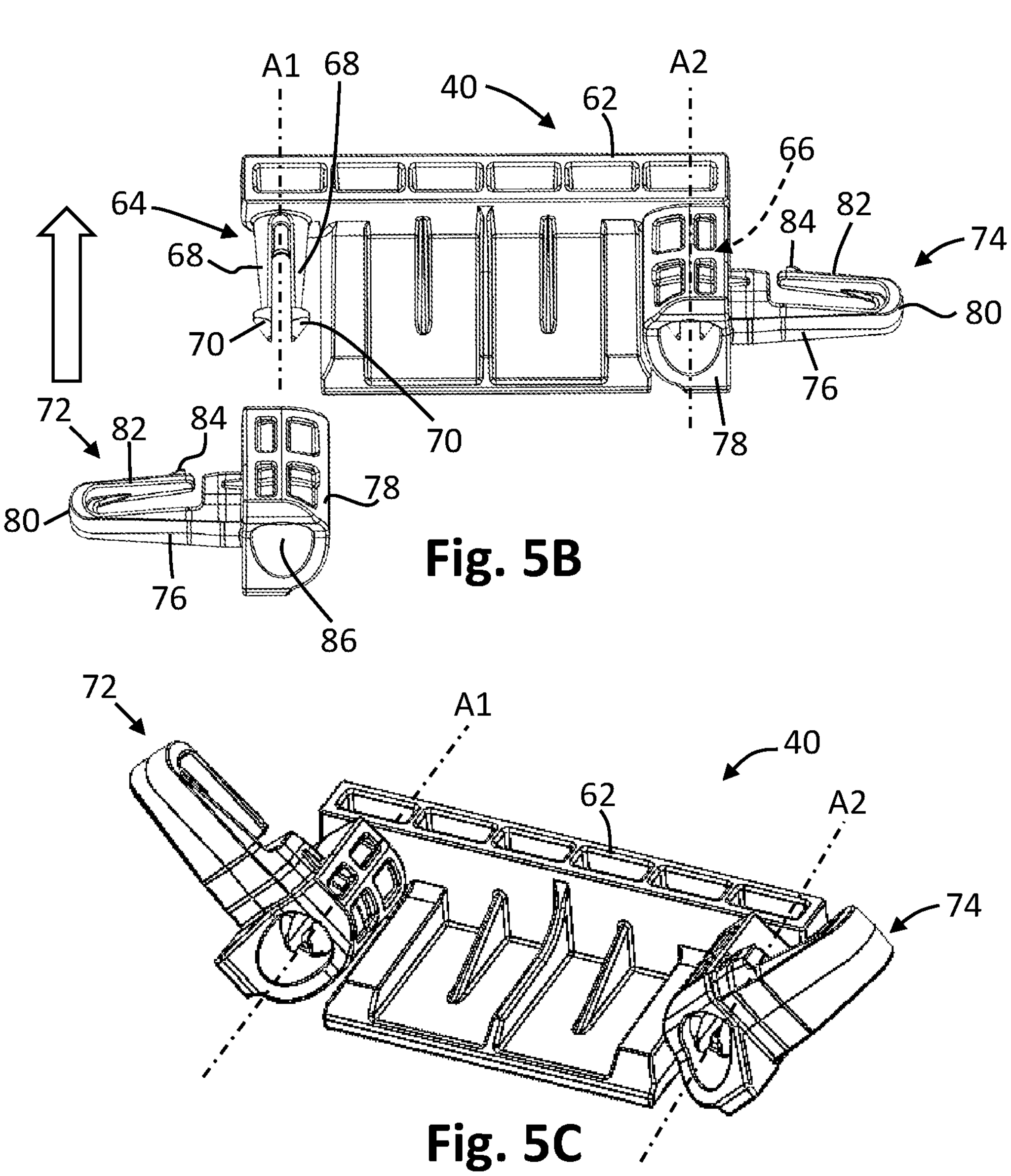
Fig. 5B
Fig. 5C

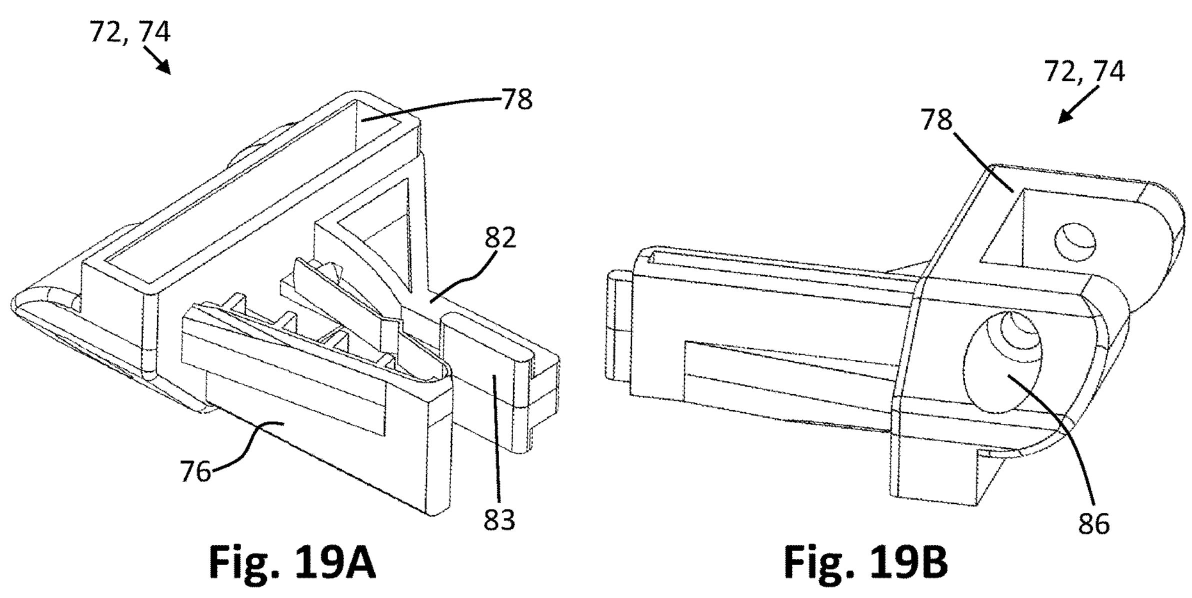
Fig. 19A
Fig. 19B
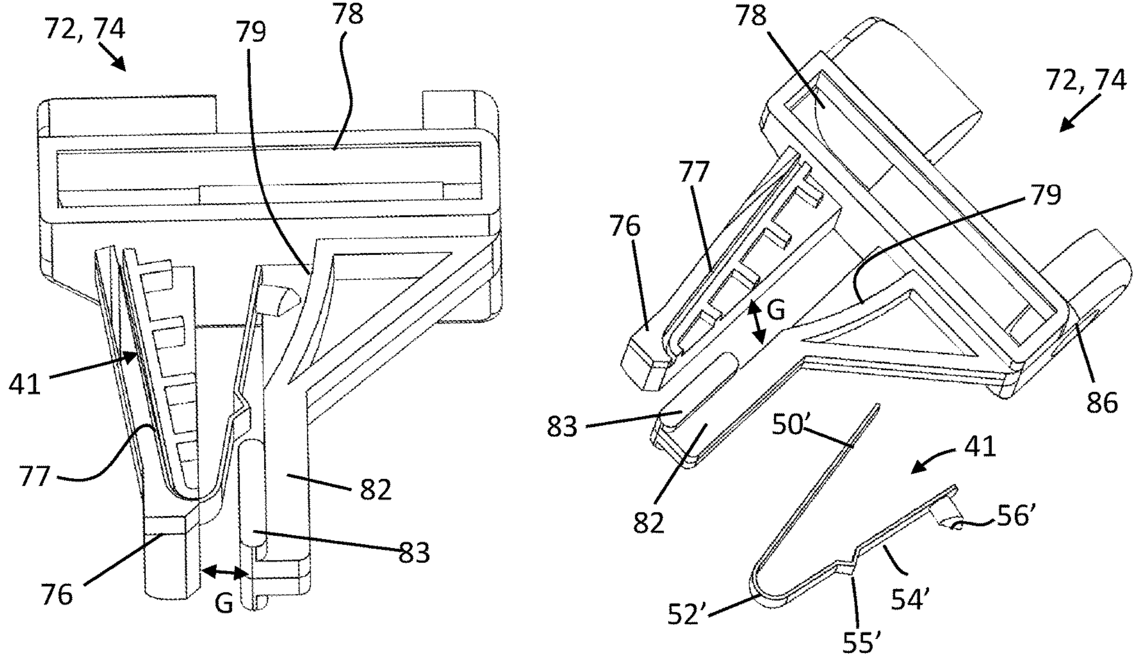
Fig. 19C
Fig. 19D

TONNEAU COVER SYSTEM

CROSS REFERENCE TO RELATED APPLICATIONS

This application claims priority to U.S. 63/425,037 filed on Nov. 14, 2022, the entirety of which is hereby incorporated by reference herein for all purposes.

FIELD

These teachings relate to a cover system for a vehicle and to a method of assembling a cover system for a vehicle.

BACKGROUND

Some vehicles, like pick-up trucks, have an open-topped bed or cargo area that may be used for storing or transporting cargo. A cover, such as a tonneau cover, may be placed over the cargo area. The tonneau cover may be opened to provide access to the cargo and/or the inside of the cargo area and closed to conceal the cargo from view and/or to prevent fluid and/or debris from entering the cargo area.

A tonneau cover may comprise a tarp or covering material that is supported on or by a frame. The frame may be constructed from several frame sections that are joined together with mechanical fasteners like screws, rivets, and the like. Such fasteners may add cost, weight, and/or assembly time complexities. It may therefore be desirable to improve the current state of the art.

SUMMARY

These teachings provide a cover system for a vehicle. The cover system may include a frame. The frame may be constructed from a plurality of frame elements. The frame elements may be connected together with one or more connectors. In some configurations, the connectors may connect together the various frame sections of the frame, without using any mechanical fasteners like screws, pins, rivets, and the like. However, in other configurations, the connectors may connect together various frame sections of the frame using mechanical fasteners like screws, pins, rivets, and the like. In other configurations, the connectors may connect together various frame sections of the frame using fewer mechanical fasteners compared to traditional frames or tonneau covers.

Advantageously, the cover system and/or frame according to these teachings may be assembled without requiring hand tools or power tools. This means assembly time may be decreased and the need to obtain expensive hand tools or power tools may be eliminated. Of course, in some configurations, an operator or user may choose to use one or more hand tools or power tools to assemble (or to assist with assembling) the cover system and/or frame for example, depending on user or owner preferences. In some configurations, mechanical fasteners may be used to attach certain components of the cover according to these teachings, such as, for example, attaching the bows to the frame. In some configurations, fewer mechanical fasteners may be required to connect together the frame and/or tonneau cover compared to traditional or currently available frame or tonneau covers.

Advantageously, the cover system and/or frame according to these teachings may be assembled faster than traditional frames that require connecting frame sections with mechanical fasteners. However, in some situations, an owner or assembler may find that the cover system and/or frame according to these teachings may take longer to assemble than tradition frames due to various factors such as: unfamiliarity with parts and components of the frame and tonneau cover and/or depending on various degree of engineering and/or assembly knowledge and experience.

Advantageously, the cover system and/or frame according to these teachings may have a lower chance of being damaged during assembly because there are no (or there are fewer) mechanical fasteners which may be overtightened, over torqued, under tightened, under torqued, stripped, etc., during assembly as compared to traditional frame and/or tonneau covers.

Advantageously, the cover system and/or frame according to these teachings may be lighter and/or less expensive to manufacture than traditional frame and cover systems since the frame is free of heavy mechanical fasteners (i.e., no metal screws, pins, rivets, etc.) or the frame includes fewer mechanical fasteners than traditional or currently available frames and tonneau covers.

Advantageously, the cover system according to these teachings can be quickly and easily disassembled and stored when not in use or when not needed. For example, if a user needs complete access to the cargo area of the vehicle, the user may quickly disassemble the cover system and store the elements of the cover system in the cargo area or cab area. In many currently available cover systems, such disassembly and storage is not readily available. Instead, a user would need to remove the cover assembly and store it as a whole, which may be awkward to handle and/or require a large footprint to store.

The cover according to these teachings may be offered to a customer or purchaser in a non-assembled configuration. Instructions may be provided in the box or available for electronic download and/or on the internet to help guide the customer to assemble or build the frame and the cover system after purchase. By transferring certain assembly aspects or responsibility of the frame or tonneau cover onto the customer, assembly costs by the manufacturer may be reduced and the savings may be passed onto the customer. Moreover, the customer may find value or added benefits of customizing the frame or cover during assembly and/or feel additional pleasure of completing the build on their vehicle.

One or more elements of the frame or cover according to these teachings may be built by the customer and/or the cover manufacturer. For example, the customer may build or assemble one or more sections of the frame and attach the cover to the frame. For example, the cover manufacturer may build or assemble one or more sections of the frame and attach the cover to the frame. For example, the cover manufacturer may assemble the connector and the customer may assemble the frame sections to the connectors. Any combination of assembly of any of the elements of the cover system disclosed herein may be performed by the cover manufacturer, the customer, or both. Moreover, by having certain elements of the assembly assembled vs. non-assembled, the cover system may be packed in and shipped in smaller and/or fewer containers or boxes, which may decrease warehouse storage space and shipping costs. Such savings may be advantageously passed onto the end customer.

The disclosure herein includes several frame sections, connectors (hinge connectors, corner connectors), insert members, etc. It is understood that any combination or sub combinations of these connectors, frame sections, etc. may be selected or "mix and matched" to construct a frame assembly. As a non-limiting example, the corner connector illustrated in FIGS. 4A-4C or FIGS. 17A-18B may be used with the hinge connector of FIGS. 5A-5C or FIGS. 7A-7C, and with any of the bow connectors illustrated in FIGS. 8A-16C. Additionally, or alternatively, the hinge insert members of FIGS. 19A-20B may be used with any of the hinge connectors illustrated in FIGS. 5A-5C or FIGS. 7A-7C. Furthermore, a locking member such as illustrated in FIGS. 17A-20B may be incorporated into the insert members of any of the hinge connectors and/or corner connectors disclosed herein.

Some tonneau covers may also incorporate features or elements of the corner connector or hinge connector into the bow connector and vice versa. In some configurations, the tonneau cover may be free of any bows or bow connectors. In some configurations, a bow may be connected to a hinge connector (for example, to the main body of the hinge connector). In some configurations, elements of the bow connector may be used to connect together adjacent frame members (horizontal and/or perpendicular frame members).

Any of the components disclosed herein (hinge connector, corner connectors, insert members, bows, bow connectors, locking member, etc.) may be manufactured from a suitable material such as aluminum, steel, metal, plastic, composite, 3D printed, etc. In some configurations, the one or more components disclosed herein (hinge connector, corner connectors, insert members, bows, bow connectors, locking member, etc.) may be available as replacement components for existing tonneau cover or frame systems. Accordingly, the disclosure herein is not necessarily limited to the entire tonneau cover system or frame system, but also to the individual components disclosed herein (i.e., hinge connector, corner connectors, insert members, bows, bow connectors, etc.).

Moreover, the disclosure herein may also relate to a method of assembling one or more mating or adjoining components together. None, some, one or more, or all of the adjacent or mating components may be assembled by the end user or buyer. None, some, one or more, or all of the adjacent or mating components may be assembled by the product manufacturer. None, some, one or more, or all of the adjacent or mating components may be assembled by a component vendor or supplier or authorized dealer or installer, between the product manufacturer and the end user or buyer.

A cover system configured for a cargo area of a vehicle, the cover system comprising: a frame comprising two or more frame sections; and a connector configured to connect together two frame sections of the two or more frame sections, wherein the connector is configured to connect together the two frame sections without use of hand or power tools. The connector is a corner connector and the two frame sections are arranged generally perpendicular to one another. The corner connector comprises a pair of insert members that are arranged at an angle relative to one another, wherein one or both of insert members comprises a U- or J-shaped feature that includes a first leg, a flexible region connected to the first leg, and a second leg connected cantilever to the flexible region, wherein the second leg comprises a prong that is configured to engage an opening defined in the frame section that it engages. The connector is a hinge connector and the two frame sections are arranged generally in line with one another. The hinge connector is configured to enable one or both of the two frame sections to move or pivot relative to the other. The hinge connector comprises a base, a pair of pins, and a pair of insert members, wherein each one of the pair of insert members is connected to each one of the insert members. The hinge connector is free of any screws or mechanical fasteners. The one or both of insert members comprises a U- or J-shaped feature that includes a first leg, a flexible region connected to the first leg, and a second leg connected cantilever to the flexible region, wherein the second leg comprises a prong that is configured to engage an opening defined in the frame section that it engages. The cover system further comprises a bow connector that is configured to connect a bow of the frame to one of the two frame sections, wherein the bow connector is configured to connect the bow to the frame section without use of hand or power tools. The bow connector comprises a clip and a receiver, wherein the receiver is configured to engage the clip to connect the bow to the frame section, wherein the clip comprises a wedge feature having a pair of ramp surfaces. The receiver comprises a pair of ramp surfaces that are configured to engage the pair of ramp surfaces of the wedge feature to connect the bow to the frame section.

A cover system comprising: a frame comprising a plurality of frame sections; a corner connector configured to connect together two frame sections of the plurality of frame sections, the two frame sections being arranged at approximately a 90-degree angle; a hinge connector configured to connect together two frame sections of the plurality of frame sections, the two frame sections being arranged in line with one another; and a bow connector configured to connect a bow to one of the plurality of frame sections, the bow being arranged generally perpendicular to the one frame section; the corner connector, the hinge connector, and the bow connector are configured to connect to the corresponding frame section(s) without use of hand or power tools. The corner connector comprises a pair of insert members that are arranged at an angle relative to one another, wherein one or both of insert members comprises a U- or J-shaped feature that includes a first leg, a flexible region connected to the first leg, and a second leg connected cantilever to the flexible region, wherein the second leg comprises a prong that is configured to engage an opening defined in the frame section that it engages. The hinge connector is configured to enable one or both of the two frame sections to move or pivot relative to the other, the hinge connector comprises a base, a pair of pins, and a pair of insert members, wherein each one of the pair of insert members is connected to each one of the insert members. The one or both of insert members comprises a U- or J-shaped feature that includes a first leg, a flexible region connected to the first leg, and a second leg connected cantilever to the flexible region, wherein the second leg comprises a prong that is configured to engage an opening defined in the frame section that it engages. The bow connector comprises a clip and a receiver, wherein the receiver is configured to engage the clip to connect the bow to the frame section, wherein the clip comprises a wedge feature having a pair of ramp surfaces, wherein the receiver comprises a pair of ramp surfaces that are configured to engage the pair of ramp surfaces of the wedge feature to connect the bow to the frame section. A method of assembling the frame of the cover system that does not require use of any hand or power tools.

BRIEF DESCRIPTION OF THE DRAWINGS

FIG. 5A is a perspective view of a hinge connector.

FIG. 5B is a top, partially exploded view of the hinge connector of FIG. 5A.

FIG. 5C is another perspective view of the hinge connector of FIG. 5A.

FIGS. 19A, 19B, and 19C are perspective views of a hinge insert member.

FIG. 19D is an exploded view of the hinge insert member of FIGS. 19A, 19B, and 19C.

DETAILED DESCRIPTION

Figure 1:
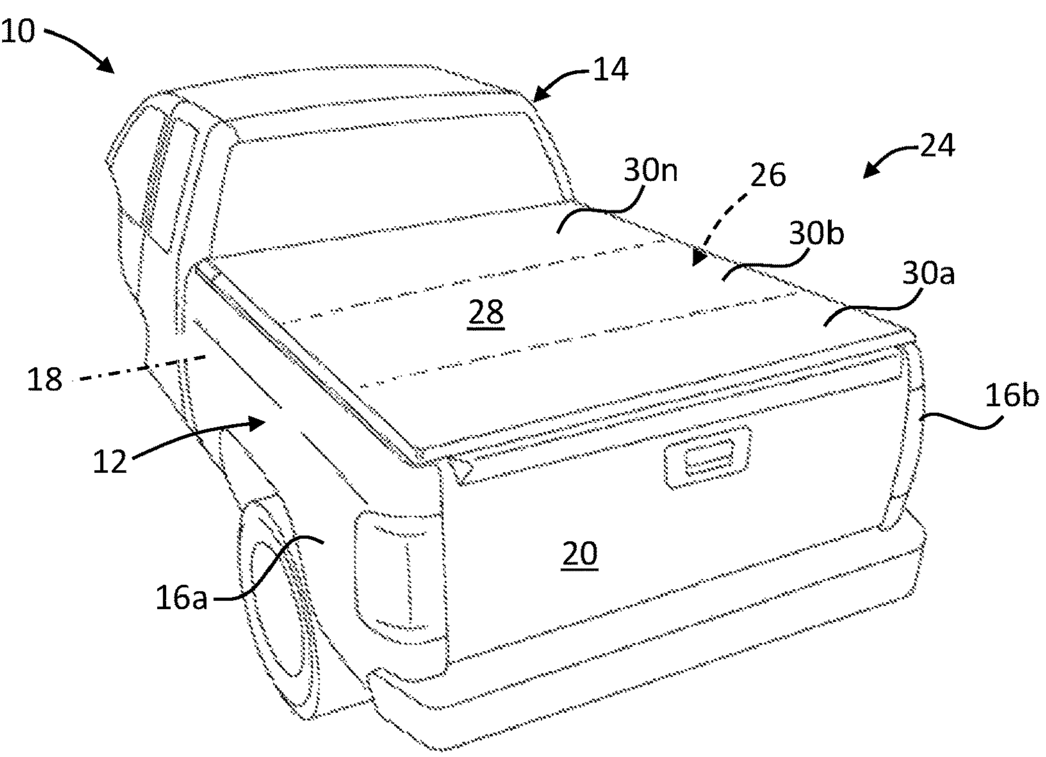
FIG. 1 is a perspective view of a vehicle and a tonneau cover system positioned over the cargo area of the vehicle.
Figure 2:
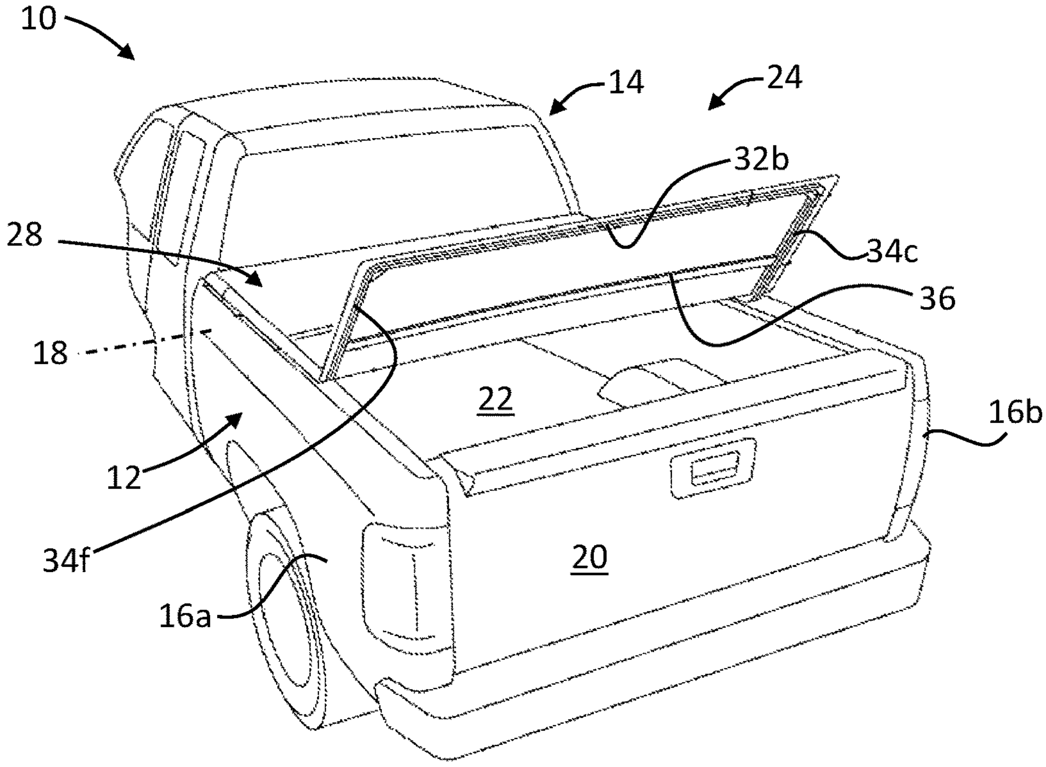
FIG. 2 is a perspective view of a vehicle and a tonneau cover system positioned over the cargo area of the vehicle, wherein one of the cover sections is raised.

A vehicle 10 is illustrated in FIGS. 1 and 2. The vehicle 10 comprises a bed or cargo area 12 and a passenger area or cab 14. The illustrated vehicle 10 is a pickup truck. However, the vehicle may be any other suitable vehicle that may find use having such a cover, such as a utility vehicle, boat, trailer, ATV, UTV, semi-truck, dump truck, camper, etc.

The cargo area 12 may be defined by one or a plurality of walls. The walls may include: opposing side walls 16*a*, 16*b*, a front wall 18 that is located adjacent to the passenger cab 14, and a rear wall or tailgate 20 that opposes the front wall 18. Two or more of these walls may be a single, combined, or integral wall. One or more of these walls may be split into two or more walls. For example, the tailgate, side wall, or front wall may be split into two or more walls to provide versatile access to the cargo area or passenger area of the vehicle, for example.

The front wall 18 of the cargo area 12 may be a shared or common wall with a back wall of the passenger cab 14. Such vehicles may be a one piece or uni-body construction. In other vehicles, the front wall 18 may be a separate wall, segment, or portion of the vehicle from a rear wall of the passenger cab 14. In some configurations, the front wall 18 may provide access to the passenger cab 14 via a pass through or fold down wall or door. The cargo area 12 has a bottom or floor 22 that is surrounded by the walls 16*a*, 16*b*, 18, 20. The bottom or floor 22 is opposite a top or open end of the cargo area 12.

A cover system 24 may be positioned, located, installed, supported, or arranged on, onto, in, or over the cargo area 12. The cover system 24 may generally include a frame 26 and a tarp or covering 28 that is attached to, supported on, or stretched over the frame 26. Some skilled in the art may refer to the cover system 24 as a tonneau cover, a tonneau cover system, or any other like similar name, acronym, or slang term known in the art to refer to the cover system described and illustrated herein.

The cover system 24 may include one or more panels or cover sections (i.e., the cover system 24 may include any number of cover sections, including no more than one cover section, one cover section, or two or more cover sections). In FIG. 1, the cover system 24 includes three cover sections 30*a*, 30*b*, and 30*n*. Adjacently positioned cover sections 30 may be connected together with one or more hinges, to allow the cover sections to move or pivot relative to each other to open and close the cover system 24. For example, cover section 30*a* may be connected to cover section 30*b* via one or more hinges so that cover section 30*a* can be moved, pivoted, or stacked onto cover section 30*b*. Cover section 30*b* may be connected to cover section 30*n* via one or more hinges so that cover section 30*b* and/or sections 30*a* and 30*b* can be moved, pivoted, or stacked onto cover section 30*n*, and so on. In FIG. 2, the cover section 30*a* is moved or pivoted into a partially open position relative to cover section 30*b*. In FIG. 2, several elements of the frame 26 are also illustrated, which are described with reference to FIG. 3.

Figure 3:
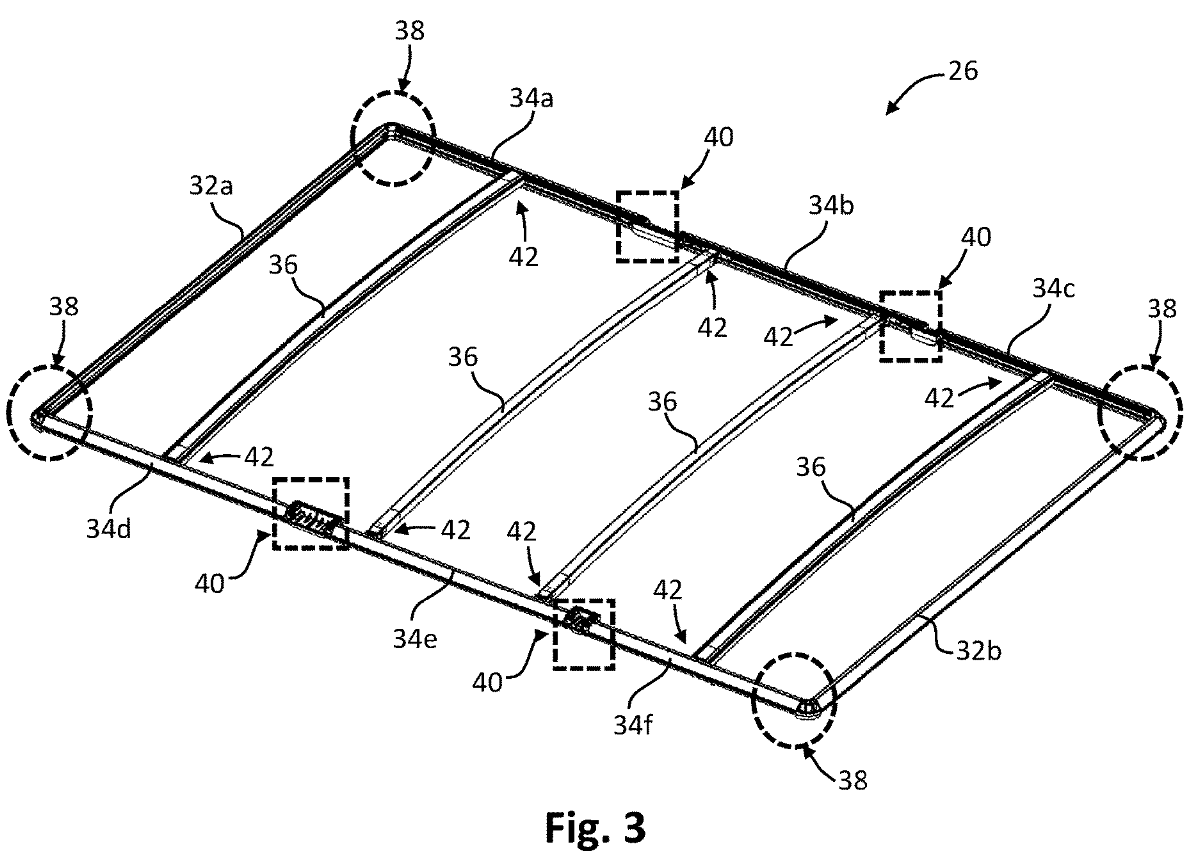
FIG. 3 is a perspective view of a frame of the tonneau cover system.

FIG. 3 illustrates the frame 26 of the cover system 24. The cover, tarp, or covering 28 has been removed from the frame 26 in FIG. 3 for clarity, to show the elements of the frame 26 without obstruction. The tarp or covering 28 may be attached to the frame 26 via one or more fasteners, such as sewing, hook and loop fasteners, rivets, screws, welds, RF welding, adhesives, glues, cables, bungee cords, wires, ropes, cable ties, and the like. The tarp or covering 28 may include one or more pockets or loops that may receive one or more elements of the frame 26 to connect or attach the frame to the tarp.

The tarp or covering 28 may be intended to be temporarily or removably attached to the frame 26, meaning that the tarp or covering 28 can be removed or separated from the frame 26, without causing damage to the tarp 28 and/or frame 28. Alternatively, the tarp or covering 28 may be intended to be permanently attached to the frame 26, meaning that the tarp or covering 28 cannot be removed or separated from the frame 26, without causing damage to the tarp 28 and/or frame 28.

The tarp or covering may be made from a suitable material, such as plastic, canvas, leather, vinyl, a synthetic material, cloth, or other flexible cloth-like material. The tarp material may be substantially flexible and soft. However, in some configurations, the cover material may be made from a rigid material, such as plastic, hard foam, resin, composite, or the like that is not flexible like a cloth-like or canvas material.

The frame 26 comprises one or a plurality of frame sections. In FIG. 3, the frame sections comprise: a pair of opposing lateral frame sections 32*a*, 32*b*; a plurality of longitudinal frame sections 34*a*, 34*b*, 34*c*, 34*d*, 34*e*, 34*f*; and one or more bows 36 that extend laterally between two opposing longitudinal frame sections (i.e., between frame sections 34*a* and 34*d*, 34*b* and 34*e*, 34*c* and 34*f*). Of course, one or more additional frame sections (i.e., lateral and/or longitudinal sections) and/or bows may be added or removed from the assembly. For example, more or less frame sections may be added or removed to allow the cover to be folded in more or less regions. For example, more frame sections may be added to increase the size of the frame and thus the cover system. Alternatively, one or more additional frame sections (i.e., lateral and/or longitudinal sections) and/or bows may be removed to decrease the size of the frame and thus the cover system.

For orientation purposes, with additional reference back to FIGS. 1 and 2, the frame 26 may be positioned on the vehicle 10 so that the lateral frame section 32*a* is adjacent to the front wall 18 and the other opposing lateral frame section 32*b* is adjacent the tailgate 20 (or vice versa). The frame sections 34*a*, 34*b*, 34*c* may be arranged on the passenger side of the vehicle and the frame sections 34*d*, 34*e*, 34*f* may be arranged on the driver side of the vehicle (or vice versa). The lateral sections 34*a*, 34*d* may be arranged near the front wall 18 and the lateral sections 34*c*, 34*f* may be arranged near the tailgate 20 (or vice versa).

Adjacent frame sections 32 and/or 34 may be connected together via one or more connectors (i.e., "corner connector" or "hinge connector" "bow connector" or other similar connector disclosed herein or currently available in the art). The one or more connectors disclosed herein (i.e., corner connector, hinge connector, bow connectors, etc.) may be free of any mechanical fasteners, like screws, bolts, rivets, and the like. Therefore, connecting the components of the frame 26 (frame sections 32, 34, bows 36, etc.) may be accomplished without the need for hand tools and/or power tools. Instead, the components of the frame (frame sections, bows 36, etc.) may be quickly connected together by hand using the connectors disclosed herein (i.e., corner connector, hinge connector, bow connectors, etc.) with simple, snap-fit connectors. Advantageously, risk of over tightening, under tightening, over torquing, under torquing, stripping, or damaging the frame sections into which a fastener may have been previously received in other prior art frame sections is eliminated. However, one or more mechanical fasteners and/or hand tools may be used to connect together the frame sections. For example, while a user may wish to have a more permanent connection of the frame members and/or cover system. For example, a user may use a mechanical fasteners if one of the connectors disclosed herein breaks or fails over time.

One having skill in the art may find that the frame 26 according to these teachings may be lighter than other frames known in the industry. However, in certain configurations, the frame 26 according to these teachings may be heavier than other known frames, due to, for example material section of the frame sections or cover material. One having skill in the art may appreciate that the container in which the cover system 24 and/or frame 26 is shipped may be lighter, since heavy mechanical screws are eliminated from the packaging. This may also have substantial freight savings for the manufacturer and/or retailer. Furthermore, by providing a frame 26 that can be broken down into smaller frame sections 32, 34, the container in which the frame 26 and/or cover system 24 is shipped may be smaller, which may result in less warehouse spaced needed to store the containers and/or more containers fitting on a shipping pallet for example.

Lateral frame section 32*a* may be connected to the opposing longitudinal frame sections 34*a* and 34*d* via a corner connector 38; and lateral frame section 32*b* may be connected to longitudinal frame sections 34*c* and 34*f* via a corner connector 38. A corner connector may provide a generally or substantially right angle or 90 degree connection between the sections.

Longitudinal frame section 34*a* may be connected to the adjacently located longitudinal frame section 34*b* via a hinge connector 40; longitudinal frame section 34*b* may be connected to the adjacently located longitudinal frame section 34*c* via a hinge connector 40; longitudinal frame section 34*d* may be connected to longitudinal frame section 34*e* via a hinge connector 40; and longitudinal frame section 34*e* may be connected to longitudinal frame section 34*f* via a hinge connector 40. Hinge connectors may provide a generally or substantially 180 degree connection between the sections.

The bows 36 may be connected to opposing longitudinal frame sections 34*a*, 34*b*, 34*c* and 34*d*, 34*e* 34*f* via bow connectors 42. The bow connectors may provide a generally or substantially right angle or 90 degree connection between the sections.

However, as has been disclosed herein, one or more features of the corner connector may be incorporated into the hinge connector and/or bow connector and vice versa. Moreover, a frame assembly and/or tonneau assembly may make use of any number or combination of connectors disclosed herein. For example, as a non-limiting example, some frame sections may be connected together using the hinge connector of FIGS. 6A-6B, and others may be connected together using the hinge connector of FIGS. 7A-7C.

While not illustrated, in some configurations, more than one bow 36 may extend between the opposing frame sections 34*a* and 34*d*, 34*b* and 34*e*, and 34*c* and 34*f* Moreover, while the bows 36 are illustrated as being arranged generally perpendicular to the frame sections 34*x*, in some configurations, one or more of the bows may be arranged at an angle other than 90 degrees to the lateral frame sections.

While frame sections 32*a*, 32*b* are illustrated as single-piece sections, it is within the scope of this disclosure that the frame sections 32*a*, 32*b* may be formed from two or more sections, that are joined together with a suitable connector. The same understanding applies to the other individual frame sections 34. The suitable connector that may join these individual sections 32 and/or 34 may allow for the sections to move relative to one another (i.e., bend or flex or rotate or pivot) or the suitable connector may provide for the sections to be located or fixed or locked or prevented from moving relative to each other.

Figures 4A, 4B, 4C:
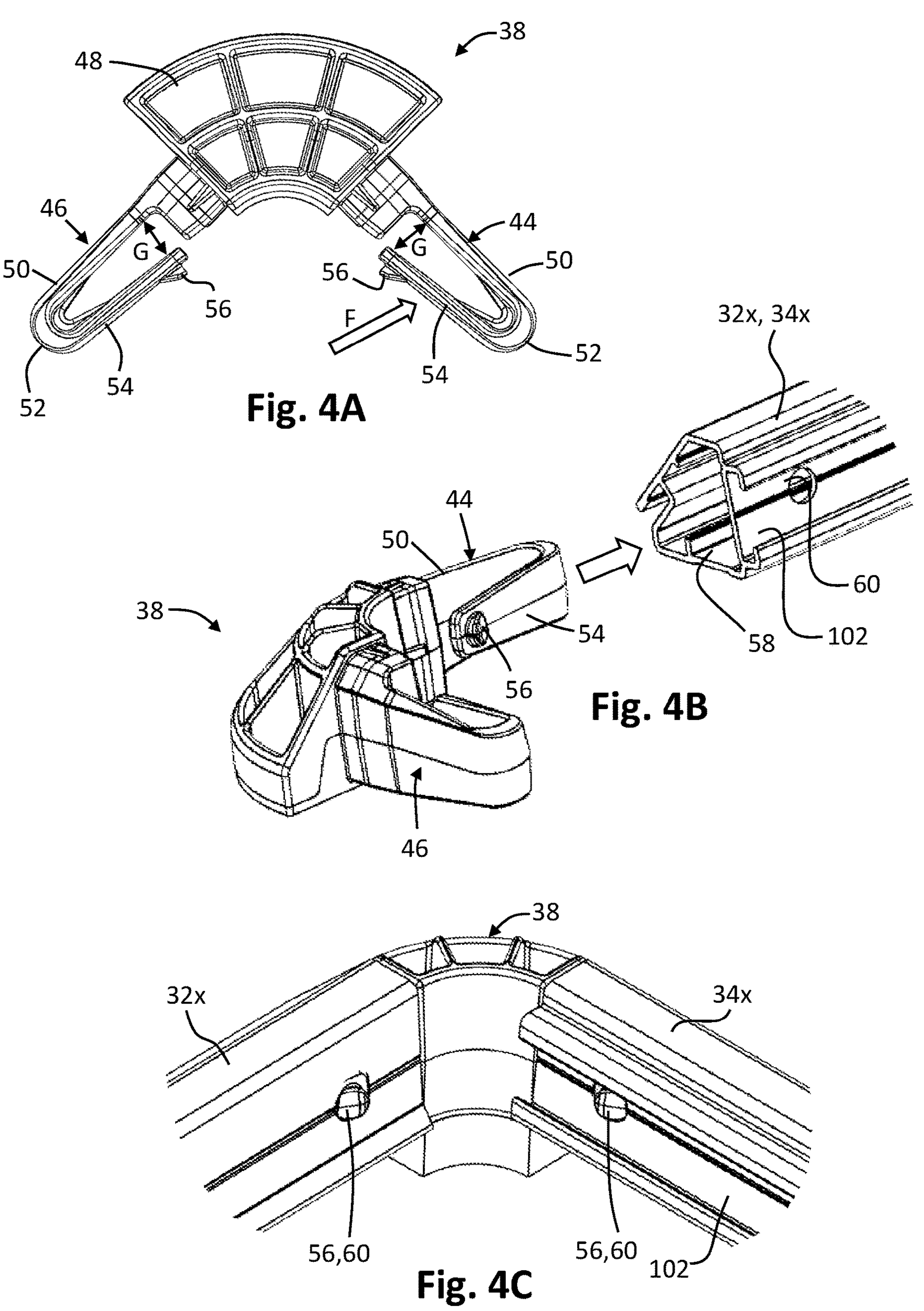
FIG. 4A is a top view of a corner connector of the tonneau cover system.
FIG. 4B is a perspective view of the corner connector and a frame section.
FIG. 4C is a perspective view of the corner connector engaged with two adjacent frame sections.

FIGS. 4A, 4B, and 4C illustrate a corner connector 38. The corner connector 38 may be configured or used for connecting adjacent frame sections of the frame 26. For example, as illustrated in FIG. 3, a corner connector 38 may be used to connect adjacent frame sections 32, 34 to form a corner of the frame 26. After connecting the frame sections 32, 34 the frame sections 32, 34 may be arranged in a generally perpendicular relationship relative to one another.

The corner connector 38 comprises one or more insert members, which will be referred to as a first insert member 44 and a second insert member 46, both of which extend angularly from a base 48 of the corner connector 38. The first and second insert members 44, 46 may be arranged at an angle relative to each other, such as a 90-degree angle. However, other angles of less than 90-degrees or greater than 90-degrees may be preferred or suitable. The angle between the insert members 44, 46 may be dependent on the desired shape of the frame 26 and/or the corner regions. For example, the angle between the insert members 44, 46 may be adjusted or tuned to account for the shape or squareness of the bed or cargo area of the vehicle. This may be important if the bed walls are not arranged at perfect right angles relative to one another.

The first and/or second insert members 44, 46 may be integrally formed with the base 48, or may be attached thereto with a suitable joining operation or fastener.

Each of the first and second insert members 44, 46 may have a U-shape or J-shape or hook-shape feature that may be defined by a first leg 50 extending from the base 48, a flexible region 52 connected to the first leg 50, and a second leg 54 extending cantilever from the flexible region 52. When a force F is applied to the second leg 54 and/or the prong 56 on the second leg 54, the flexible region 52 allows for the second leg 54 to flex, bend, move, and/or deform, so that the second leg 54 can be moved towards the first leg 50, which thus closes or reduces the size of the gap G or spacing defined between the two legs 50, 54 and thus reduces the overall cross section or size of the insert member 44, 46. This may occur during movement or insertion of the insert member 44, 46 into a frame section 32*x*, 34*x* of the frame, as illustrated in FIG. 4B. The second leg 54 includes a prong or protuberance 56 for engaging an opening 60 in the frame section 32*x*, 34*x* and locking the corner connector 38 to the frame section 32*x*, 34*x*, as shown in FIG. 4C.

FIG. 4B also illustrates a frame section. The frame section 32*x*, 34*x* may be a lateral frame section 32*x* or a longitudinal frame section 34*x*. The frame section 32*x*, 34*x* may be a generally hollow extrusion having an open end 58 into which an insert member 44, 46 can be inserted or received. Upon insertion or receipt of the insert member 44, 46 into the open end 58 of the frame section, the second leg 54 may be compressed towards the first leg 50 thus allowing insertion of the insert member 44, 46 into the frame section. The corner connector 38 or insert member 44, 46 may be inserted into the frame section until the prong or protuberance 56 is aligned with an opening or cut out 60 in the frame section 32*x*,34*x*, and then pops into the cutout 60. This may result in an audible and/or tactile click sound or feel, which may provide feedback to a user that the corner connector is sufficiently engaged with the frame section. Accordingly, the insert member 44, 46 may be locked to the frame section 32*x*,34*x*, without requiring a mechanical fastener, a hand tool, or power tool. If the frame section illustrated in FIG. 4B is a longitudinal frame section 34*x*, then the frame section 34*x* may also comprise an engagement channel 102 located at an inner face of the section 34*x* (See also FIG. 4C). The engagement channel 102 is discussed further with reference to FIGS. 8A-8C and FIGS. 10A-C and is configured to engage, receive or secure an engagement plate of a clip of a bow connector 42 to the frame section.

In some configurations, the frame sections 32*x*, 34*x* may not be hollow, but may instead be received into an open or hollow end of the insert member 44, 46. In other configurations, other attachment methods may be used, such as clamps or mechanical fasteners to connect these elements together.

The frame section 32*x*,34*x* can be easily separated from the corner connector 38 by applying a force onto the prong or protuberance 56 projecting out of the opening or cut out 60 and then pulling the corner connector 38 out of the frame section 32*x*,34*x*, in the opposite direction of the arrow in FIG. 4B. This may allow for a user to quickly disassemble the frame or connector, without using hand or power tools, if a user wishes to return or store the frame when not in use.

FIG. 4C illustrates the corner connector 38 engaging two adjacent frame sections 32*x*, 34*x*. The prongs or protuberances 56 extend from the cutouts 60, thus locking the corner connector to the frame sections 32*x*, 34*x*.

In some configurations, one end or insert member of the connector may be installed in the frame section, permanently or removably, or integrally formed therewith. This may mean that only one of the insert members is configured to be engaged and disengaged with a frame section. This may be done to limit or reduce the number of assembly steps.

FIGS. 5A, 5B, and 5C illustrate a hinge connector 40. A hinge connector 40 may be configured to connect adjacent frame sections of the frame 26. For example, as illustrated in FIG. 3, a hinge connector 40 may be used to connect adjacent longitudinal frame sections 34*x*, 34*x* together (i.e, connect together frame sections 34*a* and 34*b*; frame sections 34*b* and 34*c*; frame sections 34*d* and 34*e*; and/or frame sections 34*e* and 34*f*). A hinge connector 40 may allow for one or both of the adjacently connected frame sections to move or pivot relative to each other or relative to the cargo area of the vehicle.

Referring to FIG. 5B, the hinge 40 comprises a base 62, one or more pins, which may include a first pin 64 and a second pin 66, both of which extend from the base 62. The pins 64, 66 may have a generally similar construction to one another. However, in certain configurations, the pins 64, 66 may have a different geometry or construction relative to one another. The pins 64, 66 may cantilever from the base 62 along respective axes A1, A2. The axes A1, A2 may be generally parallel to each other. However, in some configurations, the axes A1, A2 may not be parallel to one another, depending on the intended fold geometry of the panels of the cover. One or both of the pins 64, 66 may include two spaced apart legs 68, one or both of which have a flared end 70 or a mushroom tip. One or both of the pins 64, 66 may be integrally formed with the base 62. One or both of the pins 64, 66 may be attached to the base 62 via one or more fasteners, such as adhesives, welds, pins, screws, press-fit, etc. The legs 68 may be bendable or flexible, so that when a force is applied onto one or both of the legs 68 and/or flared portions 70, the legs may move towards each other, which results in an overall size or thickness of the snap pin being reduced. When the force is removed from one or both of the legs 68, the legs 68 may resiliently relax back into their spaced apart, steady state position.

The hinge connector 40 may comprise a pair of hinge insert members 72, 74. The hinge insert members 72, 74 may have a structure that is similar to that of the insert members 44, 46 of the corner connector 38 discussed above and illustrated in FIGS. 4A-4C. That is, the hinge insert members 72, 74 may have a U-shape, J-shape, or hook shape feature that includes a first leg 76 extending from a base 78, a flexible region 80 connected to the first leg 76, and a second leg 82 extending or cantilevering from the flexible region 80. The second leg 82 may include a prong or protuberance 84. The base 78 comprises an opening 86 through which a pin 64, 66 can be inserted or received to connect the insert member to the base.

To assemble the hinge 40, the hinge insert members 72, 74 may be arranged so that the respective openings 86 slide over the respective first and second pins 64, 66, in the direction of the arrow in FIG. 5B towards the base 62. During or while the snap pins 64, 66 being moved through the opening 86, the legs 68 may be compressed towards each other and then may spring or expand back into their steady state position after the flared ends 70 pass through the base openings. The flared ends 70 may restrict or prevent the insert members 72, 74 from being pushed back or out or off of the first and second pins 64, 66. Accordingly, the hinge connector 40 may be assembled without the use of any fasteners, power tools, or hand tools.

After the hinge 40 is assembled, the hinge insert members 72, 74 are enabled or configured to rotate or a pivot about the respective pins and axis A1, A2 (compare the rotational position of the insert members 72, 74 in FIG. 5A vs. 5C).

Figure 6A:
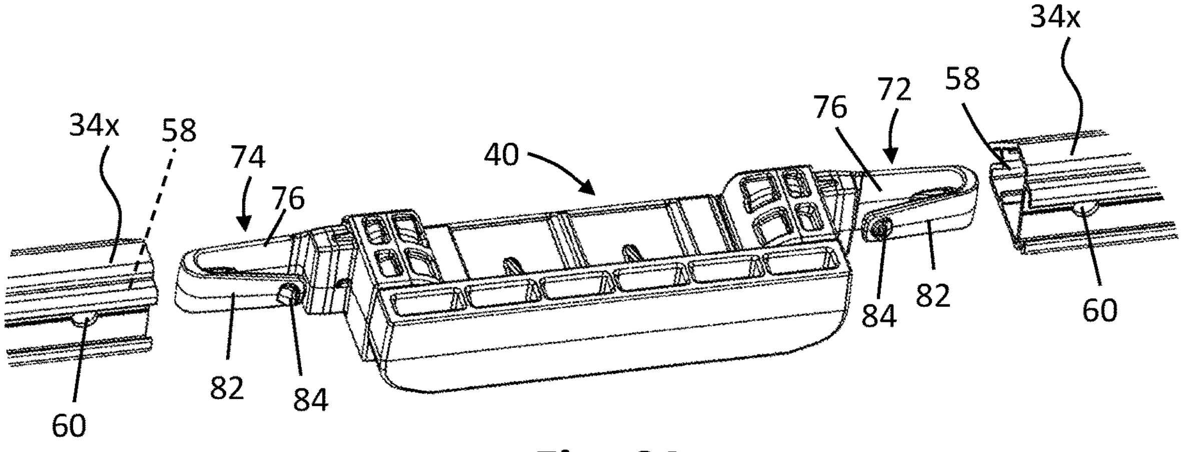
FIG. 6A is a perspective view of the hinge connector and two frame sections.
Figure 6B:
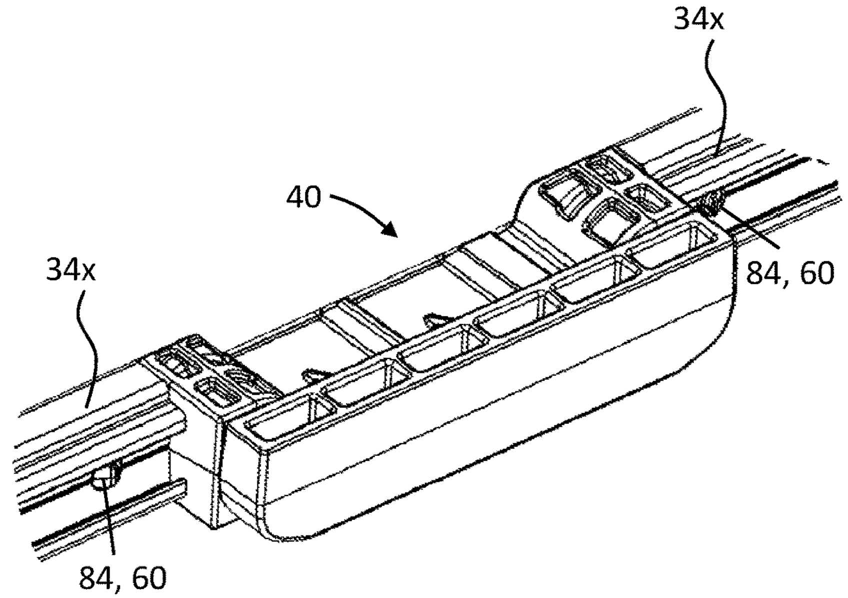
FIG. 6B is a perspective view of the hinge connector of FIG. 6A engaging two frame sections.

Referring now to FIGS. 6A and 6B, the hinge connector 40 can be connected to or between adjacent longitudinal frame sections 34X, 34X. For example, the hinge connector 40 can be assembled or connected to adjacent frame sections 34*a* and 34*b*. This will allow the respective frame sections and panels to pivot or rotate to open and close the panels or cover sections of the tonneau cover.

As discussed above at FIG. 4B, the frame sections 34*x* may have a generally hollow or open cross section and include an open end 58 into which an insert member 72, 74 can be received. Upon receipt of the insert member 72, 74 into the opening 58 of the frame section 34*x*, the second leg 82 maybe compressed towards the first leg 76 until the prong or protuberance 84 is aligned with an opening or cut out 60 in the frame section 34*x* which allows the second leg 82 to slightly relax and move away from the first leg 76 and the prong or protuberance 84 to extend through the opening or cut out 60. This may result in a click or tactile feedback, which may allow a user to confirm that the hinge connector 40 has sufficiently engaged the frame section. Accordingly, the insert member 44, 46 is locked to the frame section 34. With the insert members 72, 74 still configured to pivot about the axis A1, A2 while being connected to the frame sections 34X, 34X, that hinge 40 allows the frame 26 or the cover sections 30 to be moved or pitted at pivoted between closed and open positions, as shown in FIGS. 1 and 2 for example.

Figure 7A:
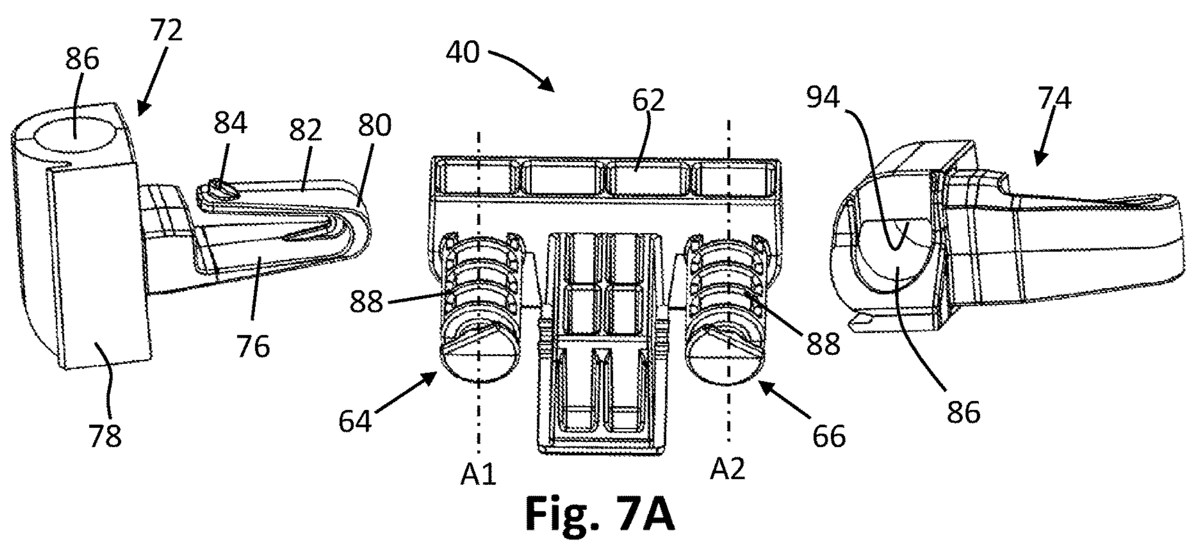
FIG. 7A is an exploded view of a hinge connector.
Figure 7B:
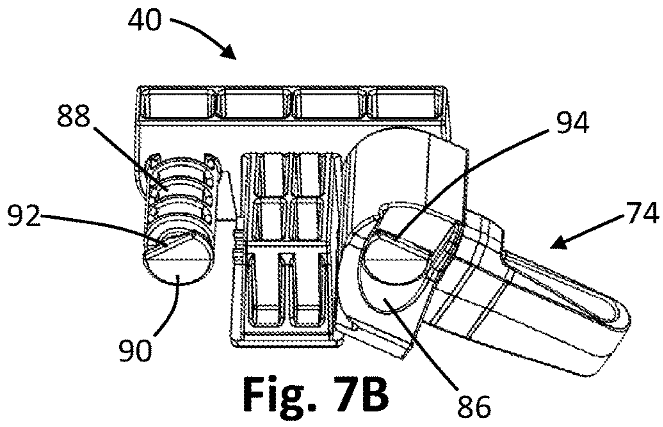
FIG. 7B is a partially assembled view of the hinge connector of FIG. 7A.
Figure 7C:
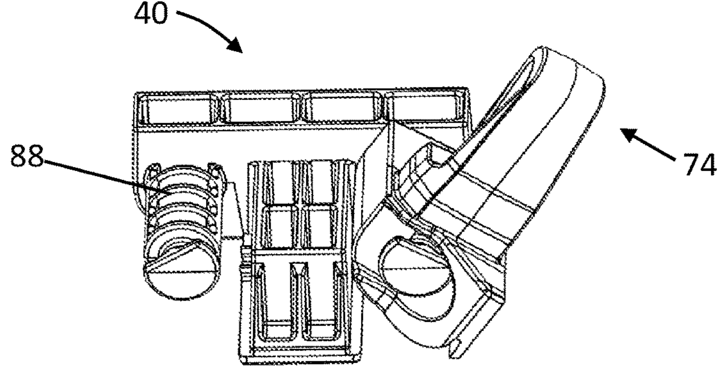
FIG. 7C is a partially assembled view of the hinge connector of FIG. 7A.

FIGS. 7A, 7B, and 7C illustrate another hinge connector 40. The hinge connector 40 of FIGS. 7A-7C may be substantially similar in structure and/or function as the hinge connector 40 illustrated and described above at FIGS. 5A-6B, therefore much of the structure and function will not be repeated with reference to FIGS. 7A-7C, in the interest of conciseness and brevity. However, it is understood that the description relating to FIGS. 5A-6B may apply to FIGS. 7A-7C and/or vice versa.

The hinge connector 40 of FIGS. 7A-7C may be used for connecting adjacent frame sections of the frame 26 and to allow those frame sections to move or pivot relative to one another. For example, as illustrated in FIG. 3, the connector hinge 40 may be used to connect adjacent longitudinal frame sections 34*x*, 34*x* together (i.e, connect together frame sections 34*a* and 34*b*; frame sections 34*b* and 34*c*; frame sections 34*d* and 34*e*; and/or frame sections 34*e* and 34*f*.

The hinge connector 40 of FIGS. 7A-7C comprises a base 62, a first pin 64, and a second pin 66 both of which extend from the base 62. The pins 64, 66 may have a generally similar construction to one another. The pins 64, 66 may cantilever from the base 62 along respective axes A1, A2. The axes A1, A2 may be generally parallel to each other. The pins may be integrally formed with the base or connected to the base with one or more suitable fasteners.

The pins 64, 66 of FIGS. 7A-7C comprise an elongated member 88 that extends from the base 62. A distal end 90 of the elongated member 88 that opposes the base 62 includes a flat or planar surface or edge 92. The hinge connector 40 may include a pair of hinge insert members 72, 74 that may be substantially similar in structure and function as the insert member 72, 74 illustrated in the figures above in FIGS. 4A-4C and/or FIGS. 5A-6A. That is, the hinge insert members 72, 74 may have a U-shape, J-shape, or hook shape feature that includes a first leg 76 extending from a base 78, a flexible region 80 connected to the first leg 76, and a second leg 82 extending or cantilevering from the flexible region 80. The second leg 82 may include a prong or protuberance 84. The base 78 includes an opening 86 through which a pin 64, 66 can be inserted or received. The opening 86 comprises a flat or planar section or surface 94.

To assemble the hinge connector 40 of FIGS. 7A-7C, the hinge insert members 72, 74 may be arranged so that the respective flat or planar sections 92, 94 of the elongated members 88 and opening 86 in the base 78 are generally aligned before the openings 86 slide over the respective first and second snap pins 64, 66 until the end 92 of the span pins 64, 66 extend or pass through the openings 86. After the hinge connector 40 is assembled, the hinge insert members 72, 74 are enabled to rotate or a pivot about the respective axis A1, A2 (compare the rotational position of the insert members 72, 74 in FIGS. 7A and 7C). Upon rotation of the hinge insert members 72, 74 so that the flat or planar sections 92, 94 are no longer aligned, the hinge insert members 72, 74 cannot be removed or separated from the base 62. The hinge connector 40 of FIGS. 7A-7C can then be assembled or connected to the frame sections 34*x* in a similar manner to that which was previously discussed with reference to FIGS. 6A-6B, without the use of hand and/or power tools.

Figures 8A, 8B, 8C:
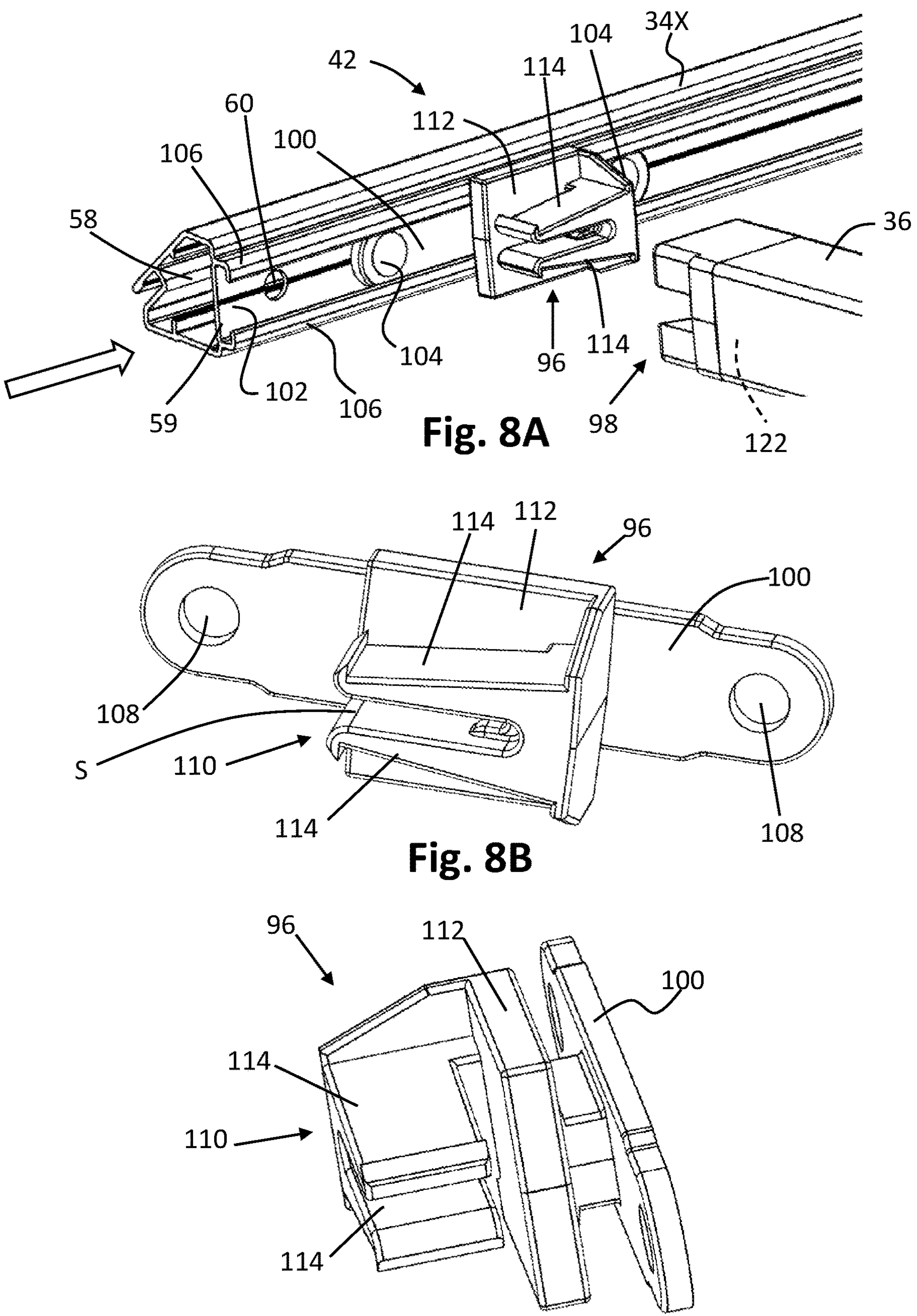
FIG. 8A is a partially exploded, perspective view of a bow connector.
FIG. 8B is a perspective view of a clip of the bow connector of FIG. 8A.
FIG. 8C is a perspective view of a clip of the bow connector of FIG. 8A.

FIG. 8A illustrates a bow connector 42. Referring back to FIG. 3, a bow connector 42 is configured to connect or secure an end of a bow 36 to a longitudinal frame section 34*a*, 34*b*, 34*c* 34*d*, 34*e*, or 34*f*. A bow connector 42 may be configured to connect bows 36 to impart rigidity into the frame and/or between opposing longitudinal frame sections. A bow connector may be configured to connect bows 36 to the frame to prevent the cover or cover material from sagging or drooping.

Figure 9A:
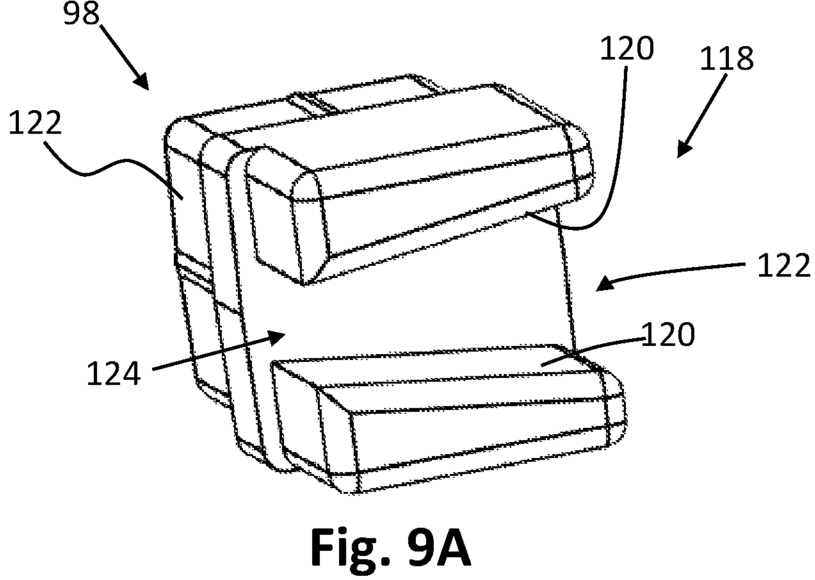
FIG. 9A is a perspective view of a receiver of the bow connector of FIG. 8A.
Figure 9B:
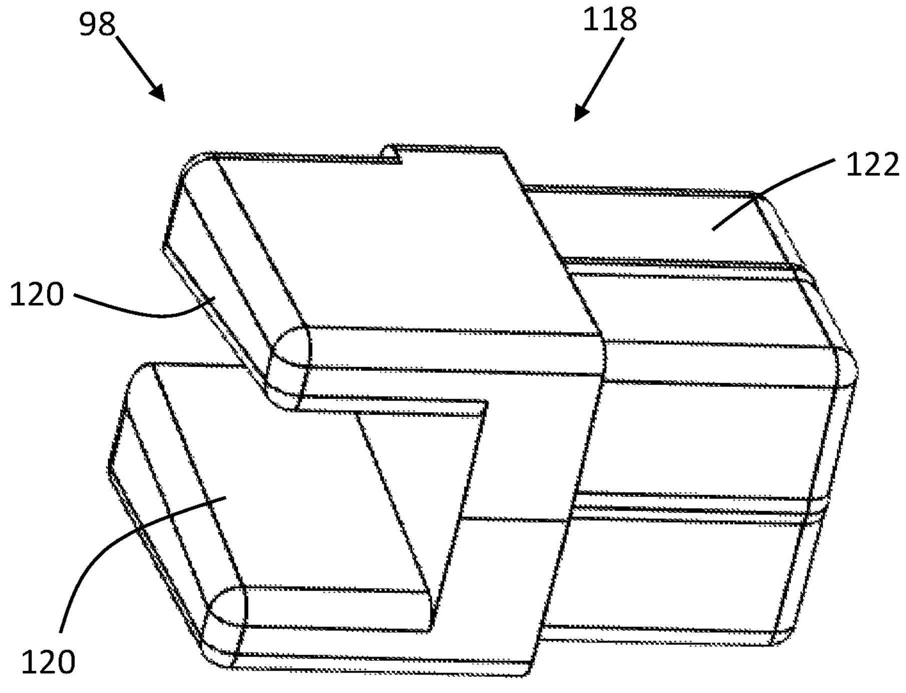
FIG. 9B is a perspective view of a receiver of the bow connector of FIG. 8A.

A bow connector 42 generally comprises a clip 96 and a mating receiver 98. The receiver 98, discussed further below with reference to FIGS. 9A and 9B, is configured to be connected to a bow 36. The receiver 98 is configured to engage or be connected to a frame section. The receiver 98 is configured to connect or engage the clip 96, as will be discussed with further reference to FIGS. 10A-10C to connect together the bow 36 and the frame section 34*x*

With additional reference to FIGS. 8B and 8C, the clip 96 comprises an engagement plate 100 that is configured to engage an engagement channel 102 defined on the frame section 34. The engagement channel 102 may extend or run along a face or length of the frame section 34 that faces inboard or a center line of the tonneau cover. The engagement plate 100 may be slid into the engagement channel 102 through an opening 59 located adjacent to the end 58 of the frame section 34, for example along the direction of the arrow in FIG. 8A. In other configurations, the engagement plate 100 or just the clip 96 may be connected directly to a side of the frame section 34.

The engagement channel 102 may comprise a pair of opposing or inwardly turned fingers or tabs 106 that are configured to retain the engagement plate 100 and prevent the engagement plate 100 from being removed from the channel 102, except through the open end 59. One or more fasteners 104 may be configured to engage openings 108 defined in the engagement plate 100 and the frame section 34 to restrict or prevent the plate 100 from moving or sliding within the channel 102. The fasteners 104 may be a push pin as illustrated, or may be a screw, set screw, adhesive, weld, hook and loop fastener, magnet, rivet, the like, or a combination thereof. FIG. 8A also illustrates a cutout 60 in the frame section 34*x*, which was discussed above as used for engaging a corner connector 38 and/or hinge connector 40, depending on the location or position of the longitudinal frame section 34 when assembled into the frame 26.

The clip 96 comprises a wedge 110 that is supported on a base 112. As perhaps best seen in FIG. 8C, the base 112 is offset or spaced apart from the engagement plate 100 a sufficient distance so that the fingers or tabs 106 can engage around the engagement plate 100.

The wedge 110 comprises a pair of ramp surfaces 114 that are separated by a space S. The ramp surfaces 114 cantilever from the base 112 so that the ramp surfaces 114 can flex or be biased towards each other when a force is acting on one or both of the ramp surfaces 114. The ends 116 of the ramp surfaces 114 include a flared feature or are turned backwards.

FIGS. 9A and 9B illustrate the receiver 98 of the bow connector 42. The receiver 98 comprises a block 118 having a pair of opposing ramp surfaces 120 at one end of the block 118. The region of the ramp surfaces 120 that are spaced farther apart may be referred to as a receiving end 122 and the other end where the ramp surfaces 120 are spaced closer together may be referred to as a locking end 124.

At the other side of the block 118, the receiver 98 comprises an engagement member 122 or protrusion that is configured to be received into or engage an opening defined the end of a bow 36 (See FIG. 8A). The opening or region into which the engagement member 122 is configured to be received may be at a distal end of the bow. In other configurations, the engagement member 122 or protrusion may be located at a distal end of the bow, and the opening or cavity for receiving the engagement member 122 may instead be part of the receiver 98. In yet additional configurations, the entire receiver 98 may be fixedly or integrally connected to an end of the bow.

Figure 10A:
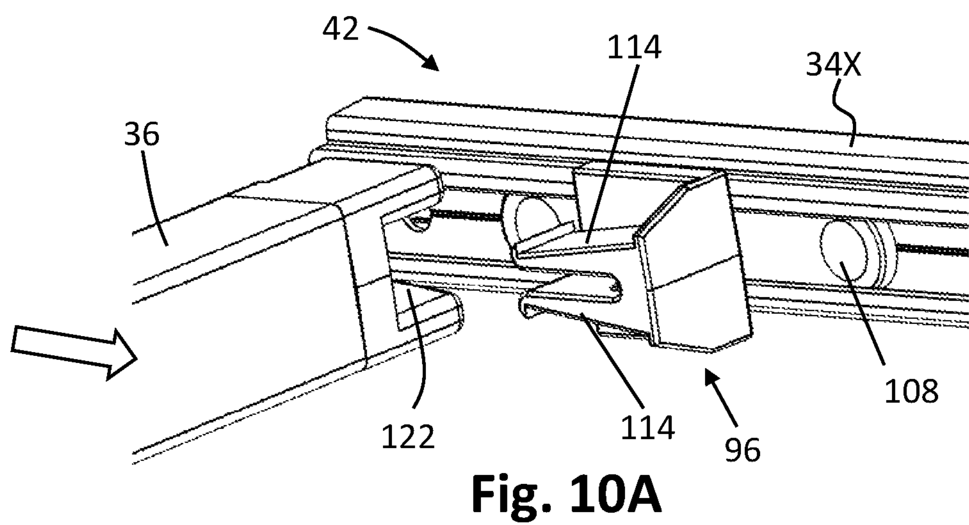
FIG. 10A is a perspective view of the bow connector of FIG. 8A.
Figure 10B:
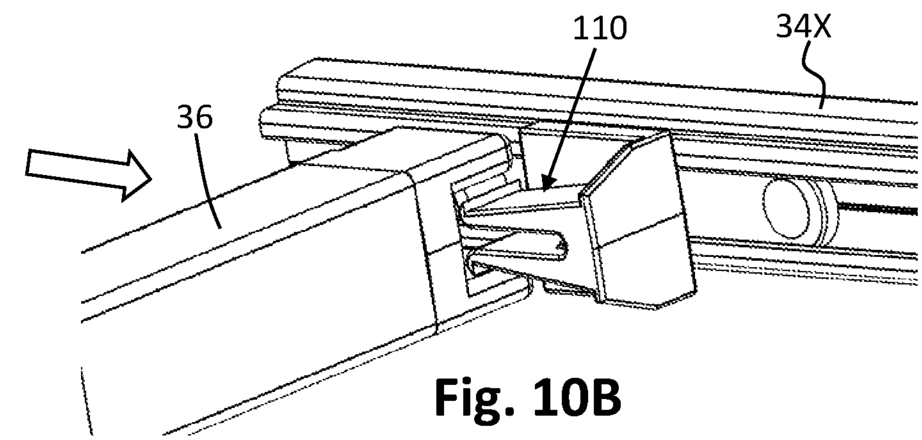
FIG. 10B is a perspective view of the bow connector of FIG. 8A.
Figure 10C:
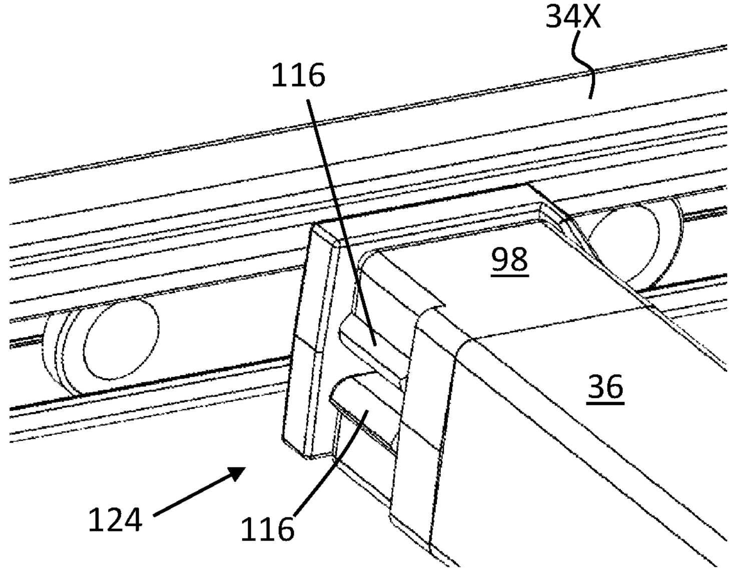
FIG. 10C is a perspective view of the bow connector of FIG. 8A.

Referring now to FIGS. 10A-10C, assembly of the bow connector 42 will be discussed. The clip 96 may be fixed or attached to the frame section 34, as was described above with reference to FIGS. 8A-8C.

The bow 36 and receiver 98 may be arranged such that the receiving end 122 of the receiver 98 is arranged adjacent to the ends 116 of the ramp surfaces 114 of the wedge 110 or clip 96. The bow 36 may be moved along a horizontal direction illustrated by the arrow so that the ends 116 of the wedge 110 enter the opening of receiving end 112 of the receiver 98 between the fap surfaces. The bow 36 maybe further moved along the direction illustrated by the arrow until the ends 116 of the wedge 110 protrude beyond the locking end 124 of the wedge 110. The upwardly turned end 116 will then engage or catch against the locking and 124 of the wedge 110 which may result in an audible click or tactile feedback, which may indicate to a user the clip and receiver are engaged, and which may thereby prevent or restrict separation of the receiver 98 and the bow 36 from the clip 96. To separate the bow 36 and the receiver 98 from the clip 96, a user may press the ends 116 of the ramp surfaces 114 together so that the ramp surfaces 114 bend or deflect towards each other and the bow 36 can then be pushed in an opposite direction (in a direction that opposes the arrows illustrated in FIGS. 10A and 10B) until the wedge 110 is removed and separated from the receiving end 122 of the receiver 98, as illustrated in FIG. 10A.

Referring to FIGS. 1, 2, 3, 8A-8C, 9A-B, and 10A-10C, A cover system 24 configured for a cargo area 12 of a vehicle 10, the cover system 24 comprising: a frame 26 comprising a first frame section 34*a*, 34*b*, 34*c*, and/or 34*n* and a second frame section 34*d*, 34*e*, 34*f*, and/or 34*n* that opposes the first frame section; a bow connector 42 connected to the first frame section 34; and a bow 36 that extends between the first frame section and the second frame section, the bow 36 comprises a receiver 98 that is configured to engage the bow connector 42 to connect the bow to the first frame section, the bow connector 42 comprises a wedge-shaped structure that is configured to engage a corresponding wedge-shaped structure on the receiver 98 of the bow 36 to connect the bow 36 to the first frame section 34. The bow connector 42 comprises a pair of ramp surfaces 114. The pair of ramp surfaces 114 of the bow connector 42 converge towards each other. One or both of the ramp surfaces 114 of the bow connector 42 comprise a distal end 116 having an upwardly turned end or wall. One or both of the pair of ramp surfaces 114 of the bow connector 42 are configured to bend, deflect, or flex towards each other, while the bow engages the bow connector. After the receiver 98 of the bow 36 engages the bow connector 42, the one or both of the pair of ramp surfaces 114 of the bow connector 42 are configured to bend, deflect, or flex away from each other. The receiver 98 comprises a pair of ramp surfaces 120. The pair of ramp surfaces 120 of the receiver 98 converge towards each other. The pair of ramp surfaces 114 of the bow connector 42 are longer than the pair of ramp surfaces 120 of the receiver 98 so that after engagement of the bow connector 42 and the receiver 98, a distal end 116 of one or both of the ramp surfaces 114 of the bow connector 42 extend beyond one or both of the pair of ramp surfaces 120 of the receiver 98. The receiver 98 comprises an engagement member 22 that is configured to be received into or engage an opening defined in an end of the bow 36. The bow connector 42 comprises an engagement plate 100 that is configured to engage a channel 102 on the first frame section 34. The channel 102 extends along a length of the first frame section 34, which extends along a length of a bed wall 16 of the cargo area 12. The channel 102 comprises a pair of opposing fingers or tabs 106. One or more fasteners 104 secure the engagement plate 100 to the first frame section 34. The cover system comprises a second bow connector 42 having a wedge-shaped structure that is connected to the second frame section 34, in a generally opposing position relative to the first bow connector 42, the bow comprises a second receiver 98 that is configured to engage the second bow connector to connect the bow to the second frame section. The wedge-shaped structure of the second bow connector comprises a pair of ramp surfaces, one or both of which are configured to bend, deflect, or flex towards each other while the second receiver engages the second bow connector; and after the second receiver engages the second bow connector, the one or both of the pair of ramp surfaces of the second bow connector are configured to bend, deflect, or flex away from each other. The pair of ramp surfaces of the second bow connector are longer than the pair of ramp surfaces of the second receiver so that after engagement of the second bow connector and the second receiver, a distal end of one or both of the ramp surfaces of the second bow connector extend beyond one or both of the pair of ramp surfaces of the second receiver. The second receiver is configured to disengage the second bow connector by biasing the pair of ramp surfaces towards each other and then sliding the receiver down the pair of ramp surfaces. The second bow connector comprises a second engagement plate that is configured to engage a channel on the second frame section.

Figure 11A:
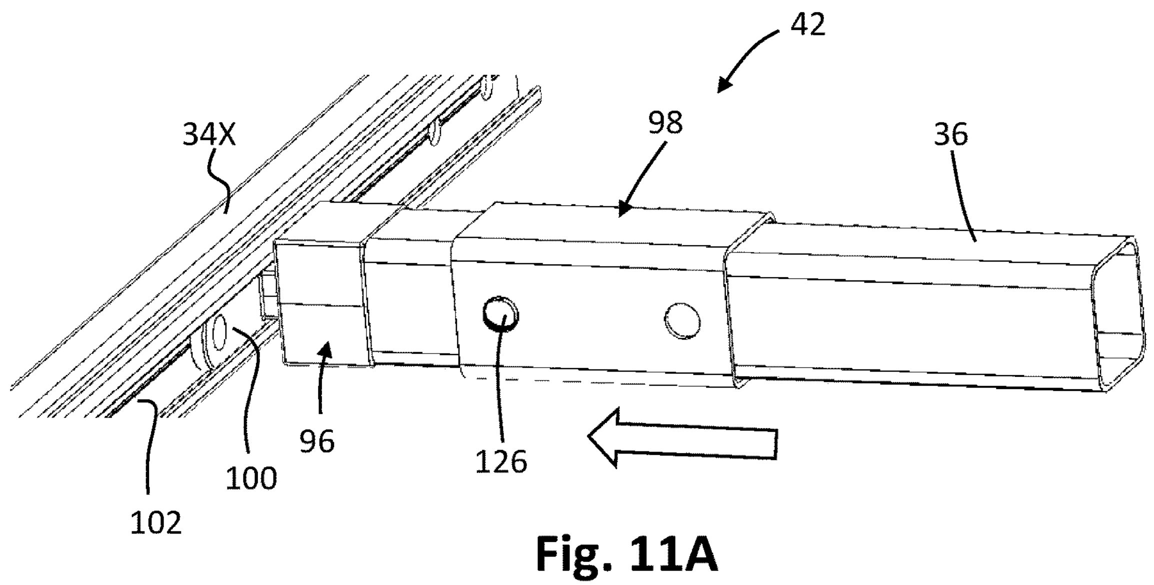
FIG. 11A is a perspective view of a bow connector.
Figure 11B:
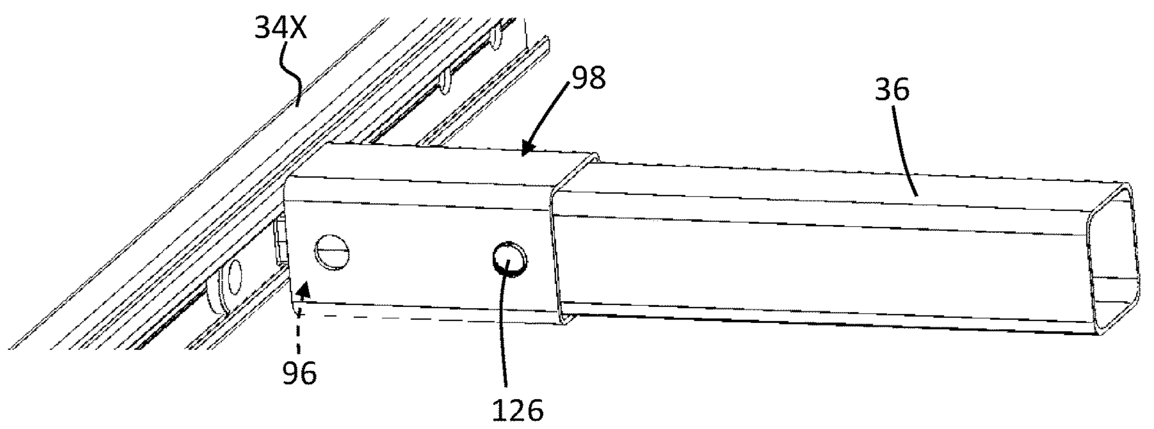
FIG. 11B is a perspective view of the bow connector of FIG. 11A.

FIGS. 11A and 11B illustrate another bow connector 42. The bow connector 42 in FIGS. 11A and 11B comprises a clip 96 that is connected to the frame section 34*x* via an engagement plate 100 engaging the engagement channel 102, as was described in the previous figures. The bow connector 42 comprises a receiver 98 that engages the clip 96 to connect the bow 36 to the frame section 34*x*. More specifically, the receiver 98 may be a free-sliding collar that engages around an outer circumference or perimeter of the bow 36 and is held in place by a spring-loaded button 126. The receiver 98 or collar is slid in the direction of the arrow over the clip 96 and then located in place by the next spring-loaded button 126. The spring-loaded button 126 may extend from only one side of the bow 36 or both (opposing) sides of the bow 36. To release the bow 36, a user may depress the spring-loaded button 126 and then move or slide the collar or receiver 98 in an opposite direction away from the frame section 34*x* (opposite direction of the arrow illustrated in FIG. 11A).

Figure 12A:
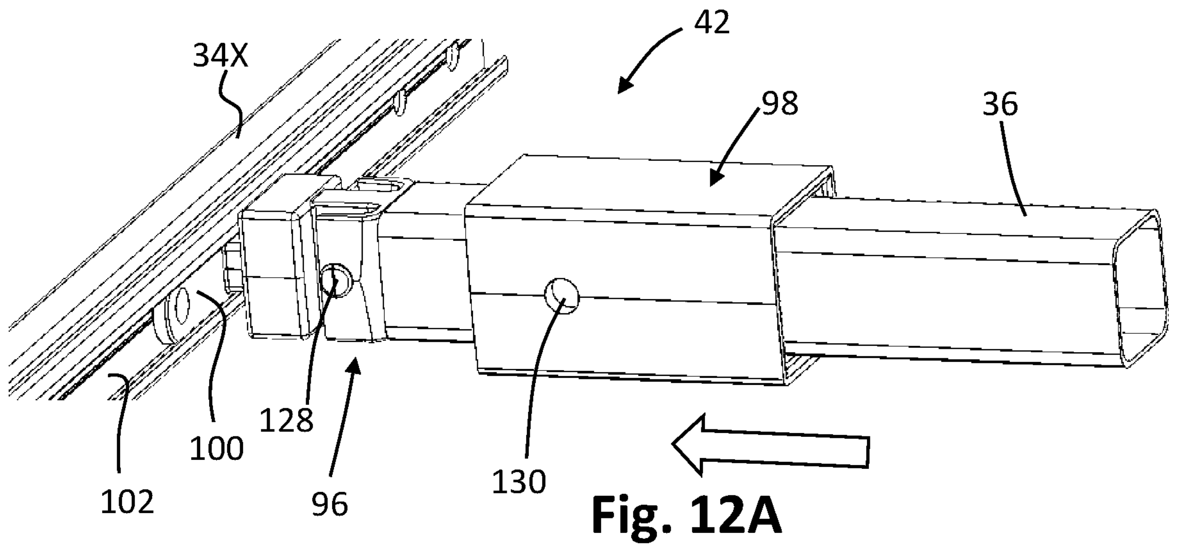
FIG. 12A is a perspective view of a bow connector.
Figure 12B:
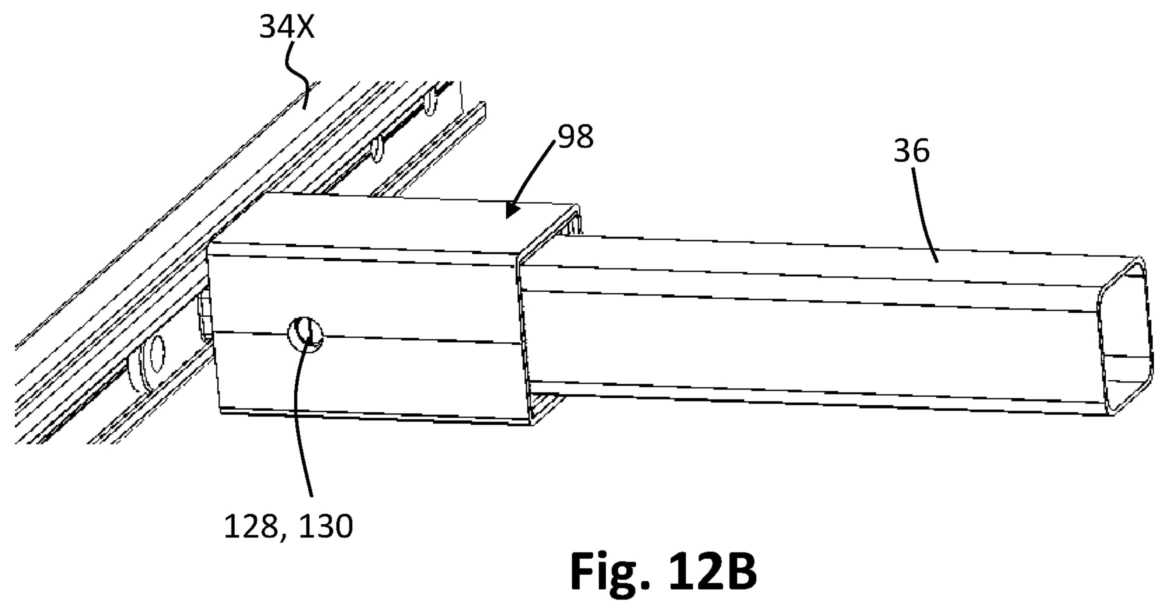
FIG. 12B is a perspective view of the bow connector of FIG. 12A.

FIGS. 12A and 12B illustrate another bow connector 42. The bow connector 42 in FIGS. 12A and 12B comprises a clip 96 that is connected to the frame section 34*x* via an engagement plate 100 that engages the engagement channel 102. The bow connector 42 comprises a receiver 98 that engages the clip 96 to bridge or connect the bow 36 to the frame section 34*x*. More specifically, the receiver 98 is a free-sliding collar that engages around an outer circumference or perimeter of the bow 36. The receiver 98 or collar is slid in the direction of the arrow over the clip 96 and then located in place by a prong or protuberance 128 on the clip 96 engaging an opening 130 on the receiver 98. The prong 128 may be a spring-loaded button. The prong 128 may extend from only one side of the bow 36 or both (opposing) sides of the bow 36. To release the bow 36, a user may depress the spring 128 and then move or slide the collar or receiver 98 in an opposite direction away from the frame section 34*x* (opposite direction of the arrow illustrated in FIG. 12A).

Figure 13A:
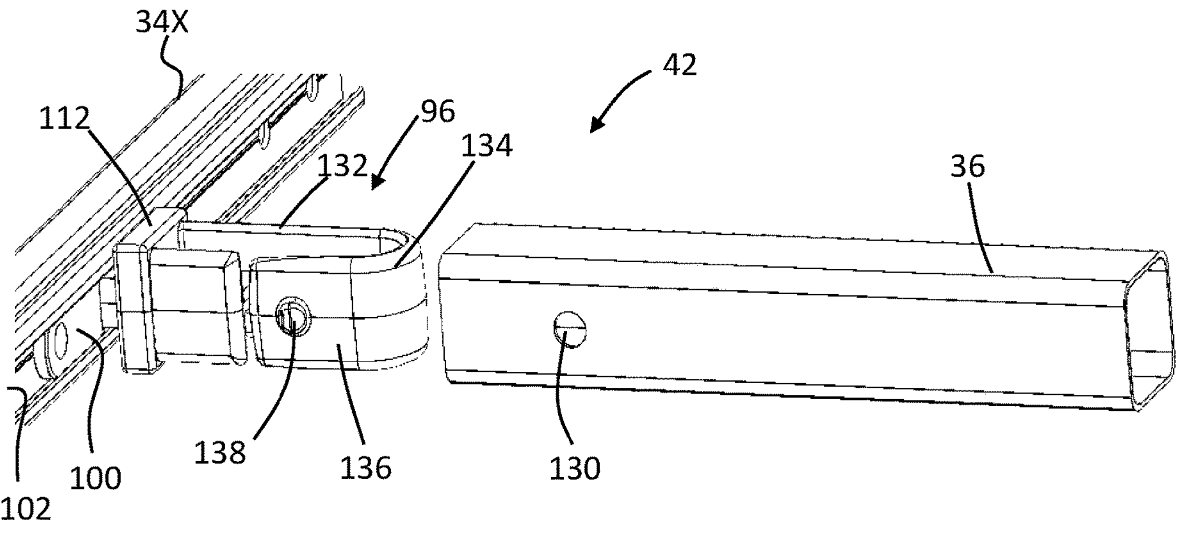
FIG. 13A is a perspective view of a bow connector.
Figure 13B:
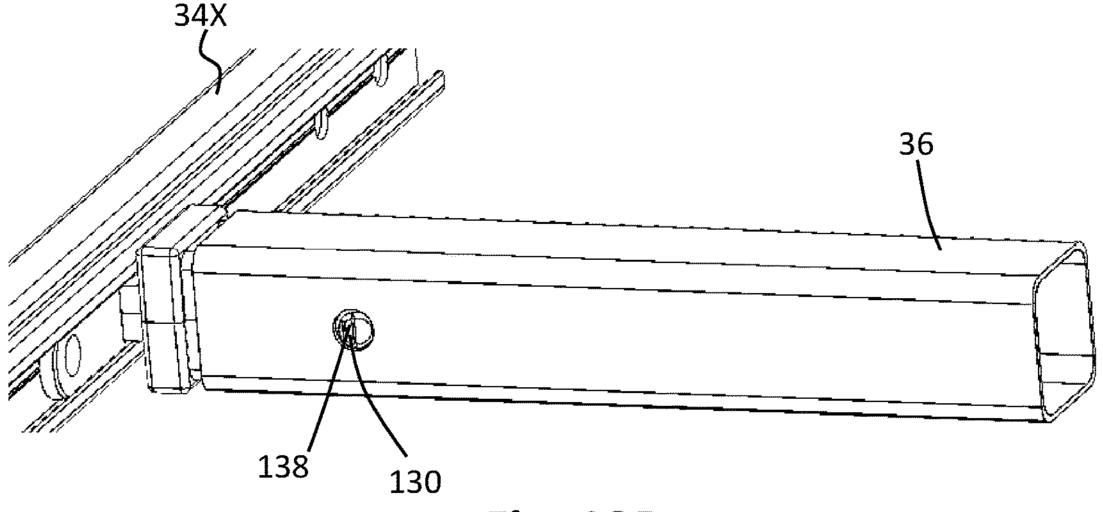
FIG. 13B is a perspective view of the bow connector of FIG. 13A.

FIGS. 13A and 13B illustrate another bow connector 42. The bow connector 42 in FIGS. 13A and 13B comprises a clip 96 that is connected to the frame section 34*x* via an engagement plate 100 that engages the engagement channel 102. The bow connector 42 does not include a receiver like the other embodiments (i.e., receiver 98). Instead, an open end of the bow 36 comprises an opening that engages the clip 96 to connect the bow 36 to the clip 96 and the frame section 34*x*. The clip 96 comprises a first leg 132 that extends from the base 112, a flexible region 134, and a second leg 136 that cantilevers from the flexible region 134. The second leg 136 comprises a prong or protuberance 138. The bow 36 is slid over the clip 96 and so that the second leg 136 bends or flexes to allow the clip 96 to fit into the open end of the bow 36. The prong 138 then engages the opening 130 to lock the bow 36 to the clip 96 and the frame section 34.

Figure 14A:
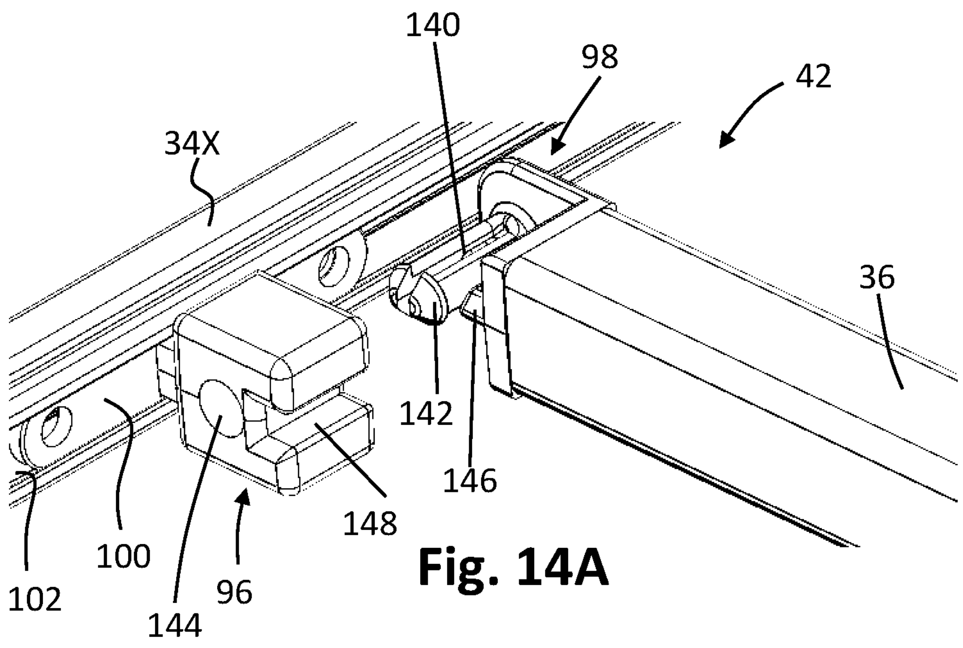
FIG. 14A is a perspective view of a bow connector.
Figure 14B:
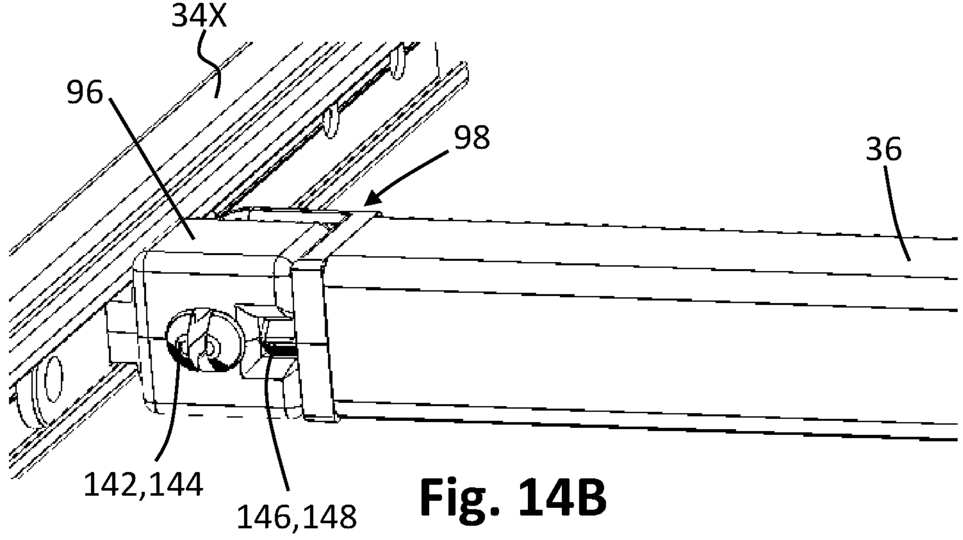
FIG. 14B is a perspective view of the bow connector of FIG. 14A.

FIGS. 14A and 14B illustrate another bow connector 42. The bow connector 42 in FIGS. 14A and 14B comprises a clip 96 that is connected to the frame section 34*x* via an engagement plate 100 that engages the engagement channel 102. The bow connector 42 comprises a receiver 98 that engages the clip 96 to connect the bow 36 to the frame section 34*x*. More specifically, the receiver 98 comprises a split pin 140 having a flared top 142 that engages an opening 144 defined in the clip 96. The receiver 98 may also include a rib 146 that engages a recess 148 in the clip 96. The split pin is compressed when engaging the opening 144 and then allowed to expand after the flared top 142 projects through the opening 144.

Figures 15A, 15B, 15C:
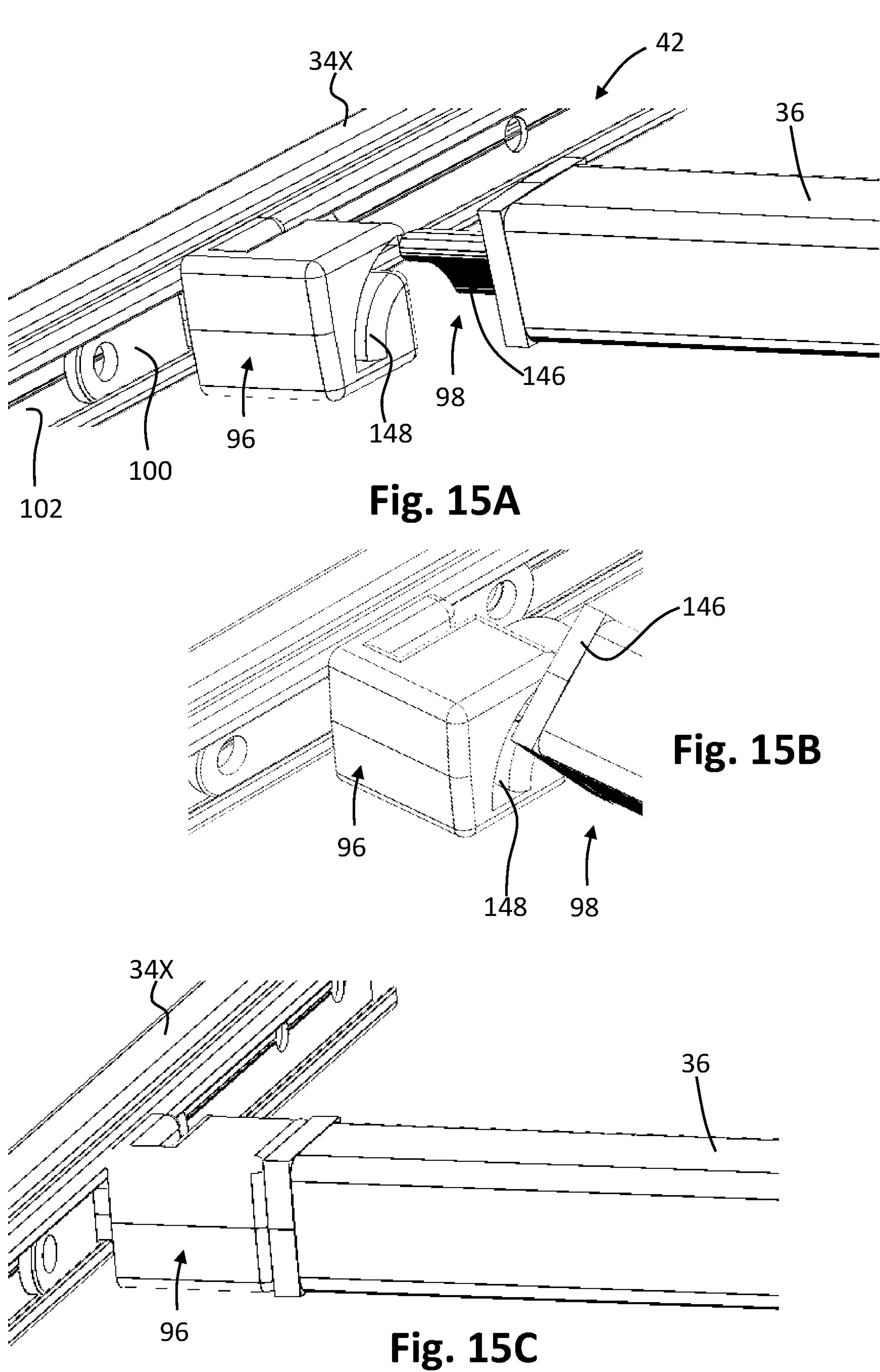
FIG. 15A is a perspective view of a bow connector.
FIG. 15B is a perspective view of the bow connector of FIG. 15A.
FIG. 15C is a perspective view of the bow connector of FIG. 15A.

FIGS. 15A, 15B, and 15C illustrate another bow connector 42. The bow connector 42 in FIGS. 15A, 15B, and 15C comprises a clip 96 that is connected to the frame section 34*x* via an engagement plate 100 that engages the engagement channel 102. The bow connector 42 comprises a receiver 98 that engages the clip 96 to connect the bow 36 to the frame section 34*x*. More specifically, the receiver 98 comprises a curved rib 146 that engages a corresponding curved track 148 defined in the clip 96. To install or connect the bow 36 to the frame section 34, the bow 36 may be positioned on its side (i.e., approximately 90 degrees from its final installed position) and then oriented so that the curved rib 146 points towards an opening of the curved track 148 in the receiver 96 and then rotate the bow 36 until the rib 146 engages the entire track 148 as illustrated in FIG. 15C.

Figure 16A:
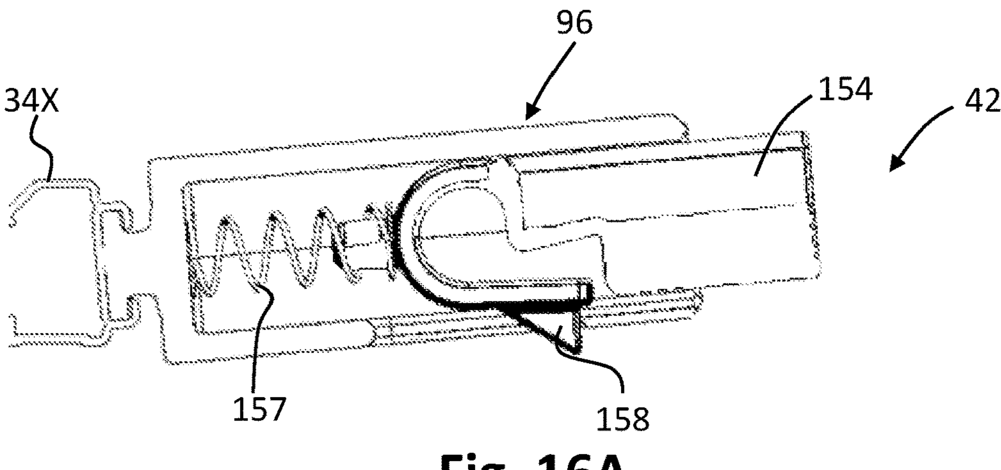
FIG. 16A is a perspective view of a bow connector.
Figure 16B:
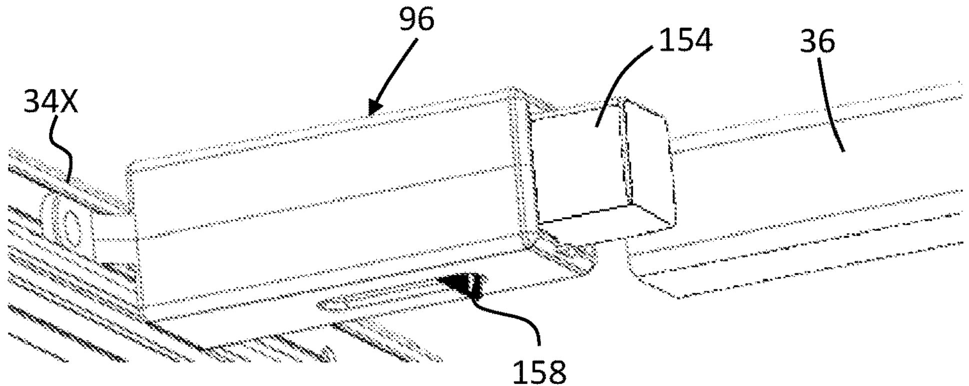
FIG. 16B is a perspective view of the bow connector of FIG. 16A.
Figure 16C:
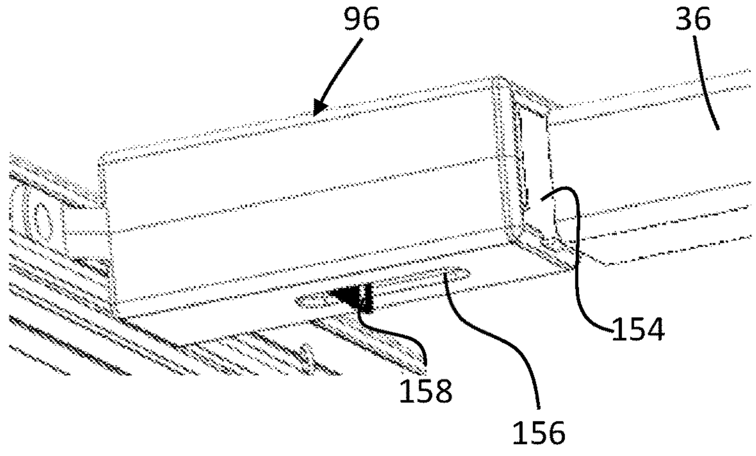
FIG. 16C is a perspective view of the bow connector of FIG. 16A.

FIGS. 16A, 16B, and 16C illustrate another bow connector 42. The bow connector 42 in FIGS. 16A, 16B, and 16C comprises a clip 96 that is connected to the frame section 34*x* via an engagement plate 100 that engages the engagement channel 102. The clip 96 comprises a spring-loaded connector 150 that includes a trigger or prong 152 connected to a extension piece 154. The trigger or prong 152 extends through a slot 156 defined in the clip 96. By drawing the trigger 152 in a direction of the frame section 34, the extension piece 154 is correspondingly retracted into the clip 96. When the trigger 152 is released, the spring 157 biases the extension piece 154 out of the clip 96 into the position illustrated in FIGS. 16A and 16B. To install or connect the bow 36 to the frame section 34, the trigger 152 may be pulled back towards the frame section 34 so that the extension piece 154 retracts into the clip 96. An open end of the bow 36 may then be generally aligned with the clip 96 or the extension piece 154 in the clip 96. The trigger 152 may then be released so that the spring 157 biases the extension piece 154 out of the clip 96 and into the open end of the bow 36, thereby connecting or locking the components together.

As can be appreciated from this description and the drawings, the frame 26 according to these teachings can be quickly and easily assembled, without the use of heavy fasteners and requiring hand tools or power tools. Instead, the frame can be quickly and easily construed using click or snap fit connectors that provide a user with an audible and/or tactile feedback that the connectors and frame sections are properly connected. Moreover, by not requiring use of fasteners, damage to the frame and/or components thereof can be reduced or eliminated by eliminating changes of over tightening or over torquing fasteners. Moreover, rick of the frame falling apart of having a weakened structure due to missing and/or under tightened fasteners is eliminated. Replacement connectors can be easily ordered or procured in the event a connector is lost or damaged. Numerous other benefits can be gleaned from this description by those skilled in the art.

Figure 17A:
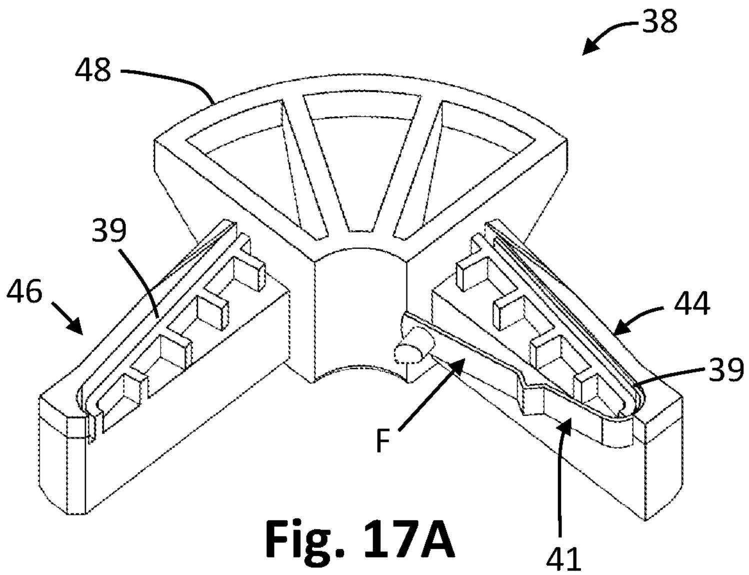
FIG. 17A is a perspective view of a corner connector of the tonneau cover system.
Figure 17B:
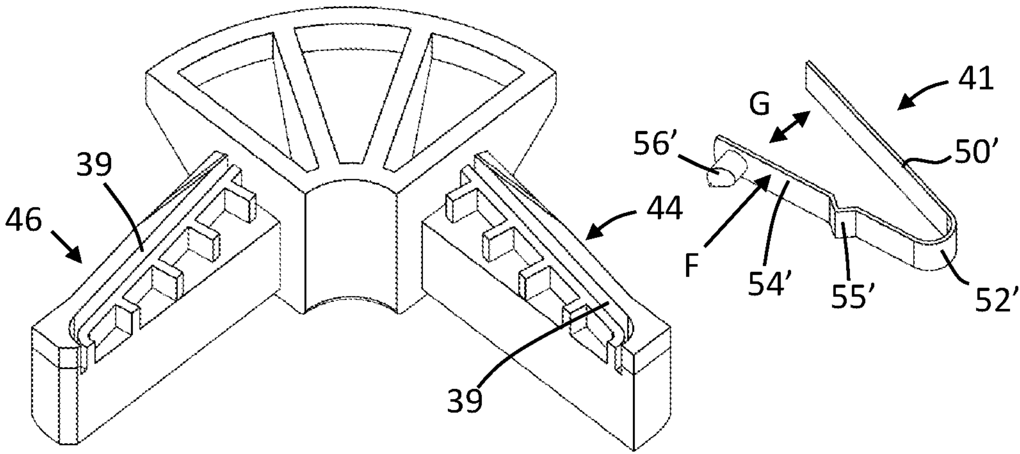
FIG. 17B is an exploded view of the corner connector of FIG. 17A.

FIGS. 17A and 17B illustrate a corner connector 38. The corner connector 38 may be configured or used for connecting adjacent frame sections of the frame 26. For example, as illustrated in FIG. 3, a corner connector 38 may be used to connect adjacent frame sections 32, 34 to form a corner of the frame 26.

The corner connector 38 comprises a first insert member 44 and a second insert member 46, both of which extend from a base 48 of the corner connector 38. The first and second insert members 44, 46 may be arranged at an angle relative to each other, such as a 90-degree angle. However, other angles of less than 90-degrees or greater than 90-degrees may be preferred or suitable, depending on the angle or configuration of the frame 26. For example, the angle between the insert members 44, 46 may be adjusted or tuned to account for the shape or squareness of the bed or cargo area of the vehicle. The angle between the insert members 44, 46 may be adjusted or tuned to provide an interference fit and/or to apply tension on the frame sections 32, 34. This description may apply to all examples of the corner connectors and frame sections illustrated and described herein.

The first and/or second insert members 44, 46 may be integrally formed with the base 48, or may be attached thereto with a suitable joining operation or fastener.

One or both of the insert members 44, 46 may include a groove or slot 39.

Figure 18A:
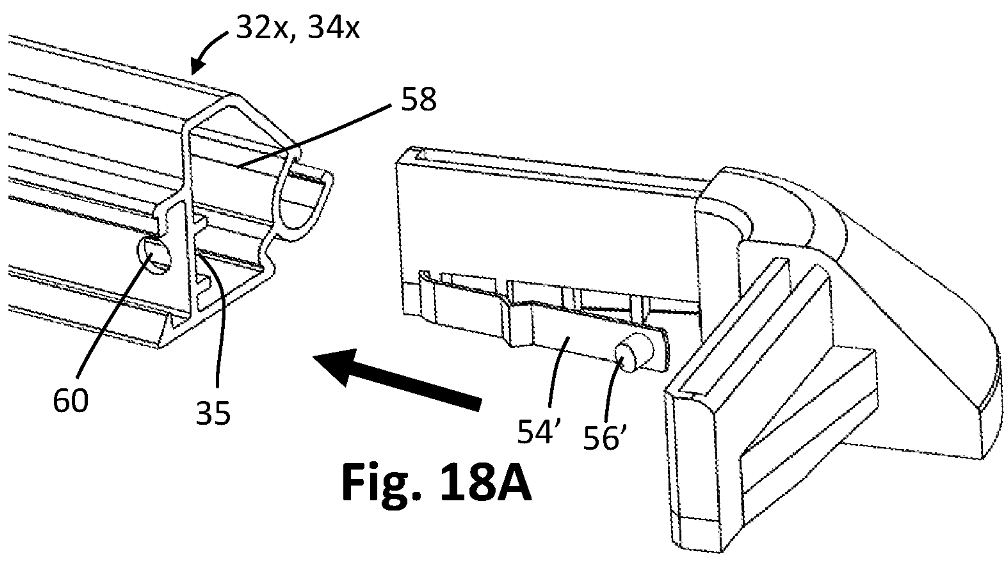
FIG. 18A is a perspective view of the corner connector of FIG. 17A and a frame section.
Figure 18B:
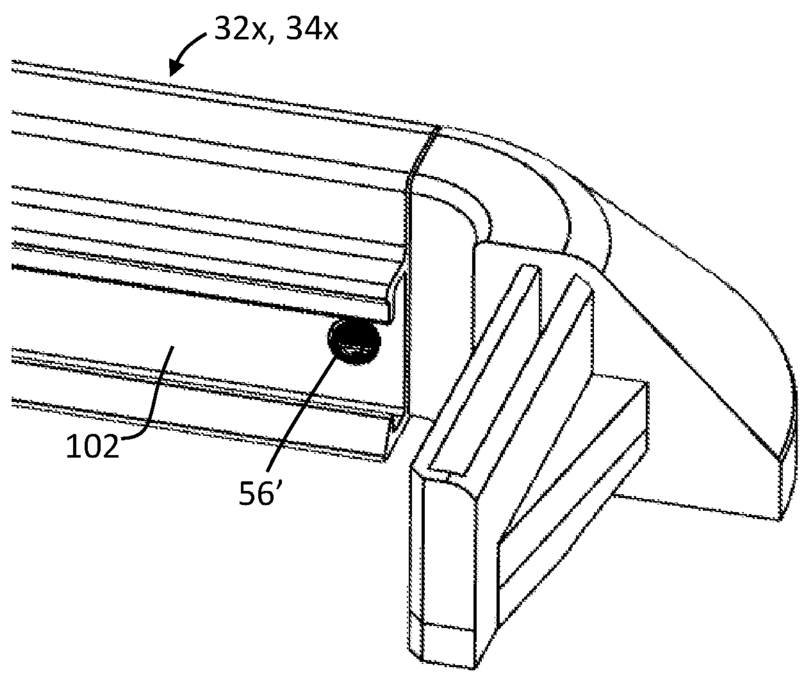
FIG. 18B is a perspective view of the corner connector of FIGS. 17A and 18A engaged with the frame section of FIG. 18A.

The corner connector 38 of FIGS. 17A and 17B may include a locking member 41. The locking member 41 is illustrated as engaging the insert member 44. It is understood that the locking member 41 may also, or may instead, engage the insert member 46. More specifically, the locking member 41 is configured to be received in, supported by, or engaged in the groove or slot 39 of one or both of the insert members 44, 46. The locking member 41 is configured to lock or engage the insert member and/or corner connector to the frame section 32, 34, similar to the function of the leg 54 of the corner connector of FIGS. 4A-4C. More specifically, the locking member 41 may have a U-shape or J-shape that may be defined by a first leg 50', a flexible region 52' connected to the first leg 50', and a second leg 54' extending cantilever from the flexible region 52'. The locking member 41 may also include a second flexible region 55' between the second leg 54' and the (first) flexible region 52'. The second leg 54' may include a prong or protuberance 56' for engaging an opening 60 in the frame section 32*x*, 34*x* and locking the corner connector 38 to the frame section 32*x*, 34*x*, as shown in FIGS. 18A and 18B.

The corner connector 38 may be assembled such that the first leg 50' is received into the groove or slot 39 on the insert member 44 and/or insert member 46. The groove or slot 39 may function to retain the first leg 50' to reduce or prevent relative movement between the leg 50' and the insert member 44 and/or base 48. The side and/or shape of the groove or slot 39 may be substantially the same as the size and shape of the first leg 50'. Alternatively, the size of the groove or slot 39 may be slightly smaller than the size of the leg 50' to provide an interference fit between the groove 39 and the leg 50' so that the locking member or leg 50' is securely retained in the slot 39. A fastener, an adhesive, and/or a prong or finger may retain leg 50' to the groove 39 or insert member 44, 46. In some configurations, the insert member 44 may be an insert that is insert molded during production of the connector 38 (i.e., an insert molding injecting molding process). In some configurations, the leg 50' may include prongs that dig into the walls defining the groove 39 to prevent or restrict subsequent removal of the insert member from the groove 39. The insert member 44 may be made of a suitable material, such as metal, aluminum, steel, spring steel, or the like. One or both of the legs of the insert member 44 may be flexible or bias able to allow the leg(s) to move or bend or flex during or after assembly or engagement with the frame section. In some configurations, the insert member 44 may be made from a plastic or resin and include a hinge or living hinge that allows the leg to bend or flex. Other types of locking members 41 are envisioned, such as magnets, pins, clips, magnets, etc. In some configurations, the leg or protuberance may be integrally formed with the hinge insert member and/or leg of the hinge insert member.

After assembly of the locking member 41 and the connector 38, the second leg 54' may be free to move, bend, or flex relative to the base 48, the insert member 44, 46, and/or the first leg 50'.

When a force F is applied to the second leg 54' and/or the prong 56' on the second leg 54', one or both of the flexible regions 52', 55' allows for the second leg 54' to flex, bend, and/or deform, so that the second leg 54' can be moved towards the first leg 50', which thus closes or reduces the size of the gap G or spacing defined between the two legs 50', 54'. This may occur during movement or insertion of the insert member 44, 46 into a frame section 32*x*, 34*x* of the frame, as illustrated in FIGS. 18A and 18B.

With additional reference to FIGS. 18A and 18B, a frame section is illustrated. The frame section 32*x*, 34*x* may be a lateral frame section 32*x* or a longitudinal frame section 34*x*. The frame section 32*x*, 34*x* may be generally the same as the other frame sections illustrated and/or described herein. The frame section 32*x*, 34*x* of FIGS. 18A and 18B may include an inner slot 35 within the hollow portion of the frame section. The inner slot 35 may be defined between two opposing walls that cantilever from a wall of the frame section towards a central region of the hollow portion of the frame section. The inner slot 35 may have a size or width that substantially matches a width or size of the second leg 54'. Accordingly, the slot 35 may function as a guide or channel that guides the second leg 54' during insertion of the insert member into the hollow portion of the frame section.

Upon insertion or receipt of the insert member 44, 46 into the open end 58 of the frame section, the second leg 54' may be compressed towards the first leg 50' thus allowing insertion of the insert member 44, 46 into the frame section. The corner connector 38 or insert member 44, 46 may be inserted into the frame section until the prong or protuberance 56' is aligned with an opening or cut out 60 in the frame section 32*x*,34*x*, and then pops into the cutout 60. This may result in an audible and/or tactile click sound or feel, which may provide feedback to a user that the corner connector is sufficiently engaged with the frame section. Accordingly, the insert member 44, 46 may be locked to the frame section 32*x*,34*x*, without requiring a mechanical fastener, a hand tool, or power tool. If the frame section is a longitudinal frame section 34*x*, then the frame section 34*x* may also comprise an engagement channel 102 located at an inner face of the section 34*x* (See also FIGS. 4B 4C for description). The engagement channel 102 is discussed further with reference to FIGS. 8A-8C and FIGS. 10A-C and is configured to engage, receive or secure an engagement plate of a clip of a bow connector 42 to the frame section.

The frame section 32*x*,34*x* can be easily separated from the corner connector 38 by applying a force onto the prong or protuberance 56' projecting out of the opening or cut out 60 and then pulling the corner connector 38 out of the frame section 32*x*,34*x*, in the opposite direction of the arrow in FIG. 18A. This may allow for a user to quickly disassemble the frame or connector, without using hand or power tools, if a user wishes to return or store the frame when not in use.

FIGS. 19A-19D illustrate a hinge insert member 72 or 74. The hinge insert member 72, 74 of FIGS. 19A-19D may be used with any hinge connector illustrated and described in this application. For example, the hinge insert member 72, 74 of FIGS. 19A-19D may be used with a hinge connector 40 that is, or is similar to, the hinge connectors 30 illustrated at FIGS. 5A-5C, 6A-6B, and/or 7A-7C. The hinge insert member 72, 74 may function similarly to the other hinge insert members illustrated and described in this application. As discussed throughout this application, a hinge connector may be used to connect adjacent frame sections of the frame 26. While only one insert member is illustrated, the insert member may be used for both insert members 72, 74. Alternatively, a mirror image of the illustrated hinge insert member may be used for the other hinge insert member 72 or 74.

For example, as illustrated in FIG. 3, a hinge connector may be used to connect adjacent longitudinal frame sections 34*x*, 34*x* together (i.e, connect together frame sections 34*a* and 34*b*; frame sections 34*b* and 34*c*; frame sections 34*d* and 34*e*; and/or frame sections 34*e* and 34*f*.

The hinge insert member 72, 74 of FIGS. 19A-19D includes a first leg 76 and a second leg 82 that both antileather or extend from a base 78. The base 78 includes an opening 86 through which a pin of the hinge connector can extend through or engage to connect the hinge insert member 72, 74 to the hinge connector or base of hinge connector (See e.g., FIGS. 5A-5C how pins 64, 68 engage the openings 86 to connect the hinge insert members 72, 74 to the hinge connector 40 and/or FIGS. 7A-7C to see how pins 64, 66 engage openings 86). Accordingly, the hinge insert members 72, 74 of FIGS. 19A-19D can pivot or rotate about the pins 64, 66 to allow the cover to bend, fold, pivot, or rotate in this/these region/s.

The first leg 76 of the hinge insert member 72, 74 includes a slot or channel 77 that may be substantially similar in structure and function to the slot or channel 39 illustrated and described above at FIG. 17A-B. In other words, the slot or channel 77 may function to engage and/or retain a leg of the locking member 41. The locking member 41 may also be similar in structure and function to the locking member 41 discussed above at FIGS. 17A-17B and 18A-18B. In other words, the locking member 41 is configured to lock or engage or retain the hinge insert member 72, 74 and/or the hinge connector to the frame section 32, 34. More specifically, as best viewed in FIG. 19D (and/or FIG. 17B), the locking member 41 may have a U-shape or J-shape that may be defined by a first leg 50', a flexible region 52' connected to the first leg 50', and a second leg 54' extending cantilever from the flexible region 52'. The locking member 41 may also include a second flexible region 55' between the second leg 54' and the (first) flexible region 52'. The second leg 54' may include a prong or protuberance 56' for engaging an opening 60 in the frame section 32*x*, 34*x*.

When the locking member 41 is installed in the slot or channel 77, the prong or protuberance 56' extends in a direction of the second leg 82 of the hinge inset member 72, 74. As perhaps best visible in FIG. 19C, the second leg 82 includes a recessed region 79 which allows the prong 56' to not contact any part of the second leg 82 when the locking member 41 is in an uncompressed state (FIG. 19C).

A gap G is defined between the first leg 76 and the second leg 82 of the insert member 72, 74.

The second leg 82 of the hinge insert member 72, 74 may include a standing rib 83. The standing rub 83 may be on an inner portion of the second leg 82 that is adjacent to the first leg 76. The standing rib 83 may be configured to engage an engagement channel 102 defined on the frame section 34. The engagement channel 102 may extend or run along a face of the frame section 34.

Figure 20A:
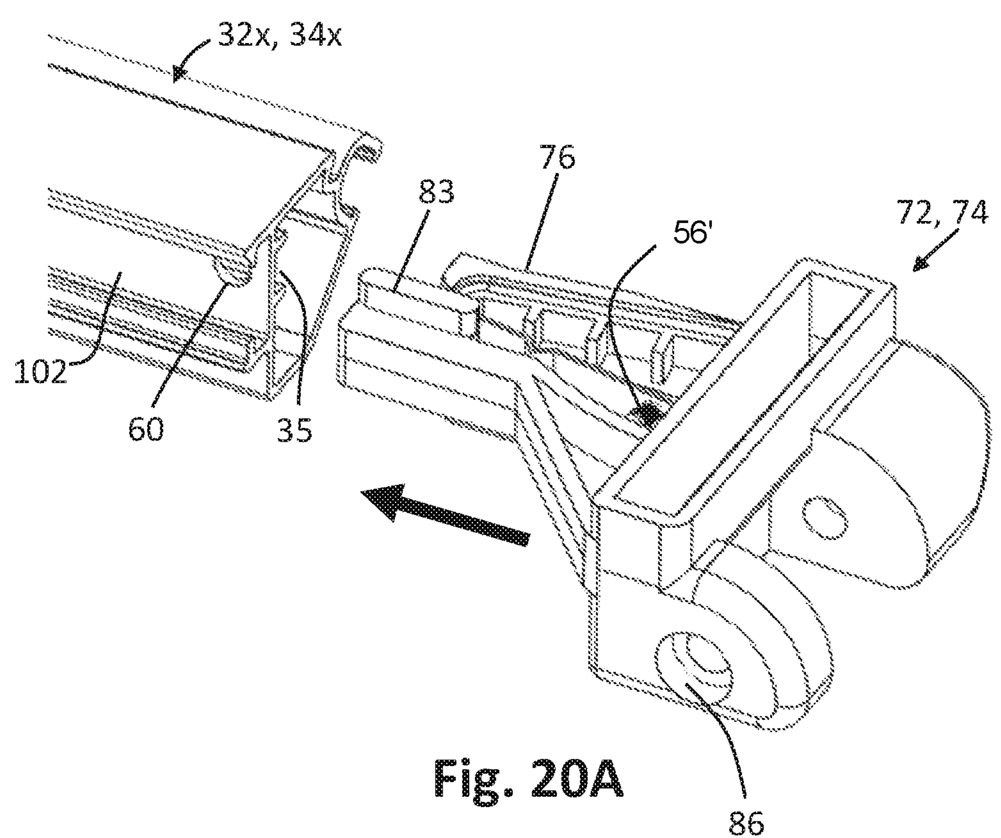
FIG. 20A is a perspective view of the hinge insert member of FIGS. 19A-19D and a frame section.
Figure 20B:
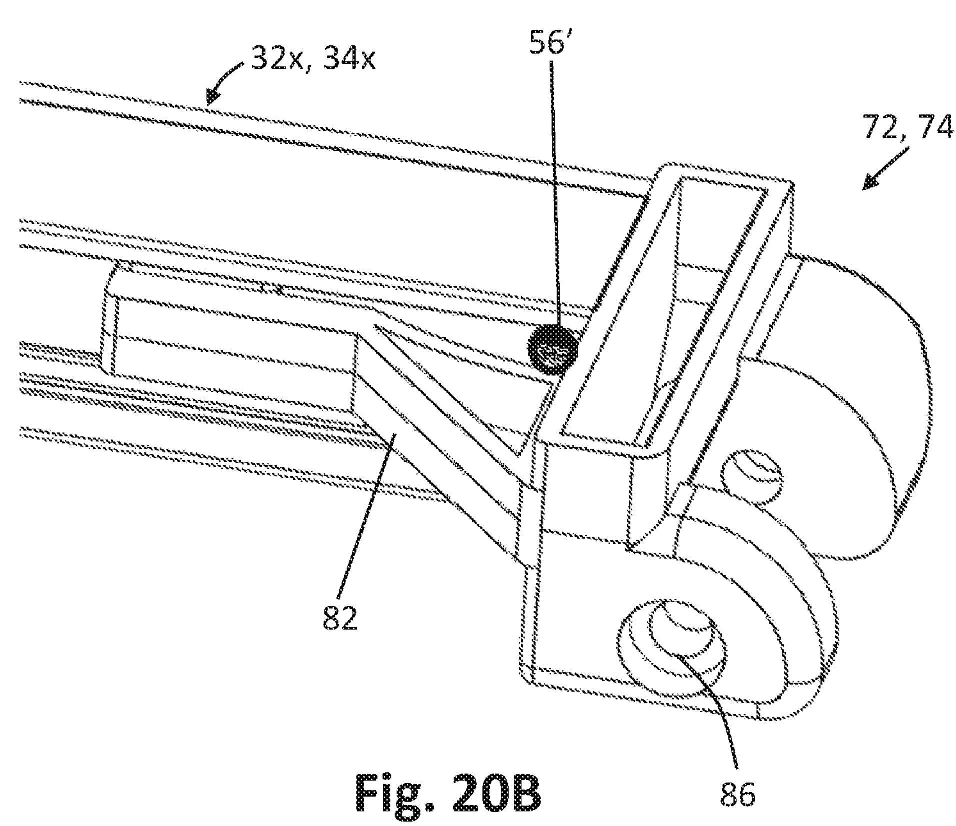
FIG. 20B is a perspective view of the hinge insert member of FIG. 20A engaging the frame section of FIG. 20A.

With additional reference now to FIGS. 20A and 20B, the hinge insert member may be assembled to the frame section by guiding and/or inserting the first leg 76 into the hollow or open space of the frame section while also guiding or inserting the standing rub 83 into the engagement channel 102. Accordingly, a wall thickness of the frame section (the wall that includes the opening may be received into the gap G defined between the first leg 76 and second leg 82 (FIGS. 19C-19D). This results in the first leg 76 being located inside of the frame member, while a portion of the second leg 82 is located outside of the frame member (See FIG. 20B). As the hinge insert member is moved into the frame section, the second leg 54' of the locking member 41 may be guided into the slot 35. The hinge insert member may be inserted into the frame section until the prong or protuberance 56' is aligned with an opening or cut out 60 in the frame section 32*x*,34*x*, and then pops into the cutout 60. This may result in an audible and/or tactile click sound or feel, which may provide feedback to a user that the corner connector is sufficiently engaged with the frame section. Accordingly, the hinge insert member may be locked to the frame section 32*x*,34*x*, without requiring a mechanical fastener, a hand tool, or power tool.

The vehicle may be any vehicle that has a cargo area or bed. The cargo area or bed may be any area or portion of the vehicle used for storing or transporting goods or cargo. The cargo area may be any part of the vehicle that has an open top. The open top can be at least partially closed or covered by a cover, which may be a trunk, decklid, tonneau cover, cap, tent, tarp, board, or a combination thereof. The cargo area may be a cargo box, a bed, a trunk, or a combination thereof. The cargo area may also be a trailer that is configured to be pulled or pushed by the vehicle.

The cargo area may be defined by one or more bed walls. The one or more bed walls may be a fender, side wall, front wall, a back wall or tailgate, or a combination thereof.

The cover system may be configured to rest or sit on a top surface of one or more of the bed walls, when the cover system is in a closed or horizontal portions. The cover system may be configured to rest or sit on one or more bed rails that are attached to the one or more walls defining the cargo area when the cover system is in a closed or horizontal portion, The cover system may function to cover the cargo area; prevent access into the cargo area; prevent intrusion of water, wind, debris, or any combination thereof into the cargo area; protect items stored in the cargo area; or any combination thereof. The cover system may selectively engage or contact a frame rail assembly that is attached to the walls of the cargo area and/or the top of the walls of the cargo area when the cover system is in a closed or horizontal position. The cover system may be referred to as a tonneau cover. The cover system may be a hard folding tonneau cover, a soft folding tonneau cover. In some configurations, one or more of the teachings herein may be applied to a soft or hard rolling tonneau cover system.

The cover system may be of the type disclosed in commonly-owned U.S. Pat. No. 8,960,765 B2, the teachings of which are incorporated by reference herein for all purposes. The frame disclosed herein may be used with or incorporated into the cover system of U.S. Pat. No. 8,960,765 B2. The teachings of U.S. Pat. No. 8,960,765 B2 may be incorporated into the teachings disclosed herein.

The cover may be a flexible, rigid, or both. The cover may be formed of a fabric, a unitary sheet, or both. The fabric may include woven fabric or non-woven fabric. The fabric, the unitary sheet, or both may comprise a polymer, an organic material, or both. The organic material may include cotton and/or the like. The polymer may include vinyl, polyester, the like, or any combination thereof. The cover may have a length, along the centerline, that is approximately equal to as the length of the cargo area, along the centerline. The cover may have a width, transverse to the center line, that is approximately equal to as the width of the cargo area, transverse to the centerline. The cover may span across and/or over the cargo area. The cover may be manipulated to fold, un-fold, roll, un-roll, store, deploy, or any combination thereof. The tonneau cover may have a bottom side opposing a top side. The bottom side may face toward the floor (i.e., bottom) of the cargo area. The top side may be opposite the bottom side, face away from the floor of the cargo area, or both. The cover may include one or more edges. The one or more edges may be located around a portion or an entire perimeter of the frame.

The cover system may include one or more frame sections and/or bows. The one or more frame sections and/or bows may function to support the cover, tension the \ cover, or both. The one or more frame sections and/or bows may be curved, straight, or both. The one or more frame sections and/or bows may have a unitary construction or comprise multiple segments. The one or more frame sections and/or bows may comprise polymer, metal, or both. The polymer may be acrylonitrile butadiene styrene, polyvinyl chloride, nylon, polystyrene, polyethylene, polycarbonate, the like or any combination thereof. The metal may be aluminum, steel, titanium, brass, the like, or any combination thereof. The one or more frame sections and/or bows may be extruded, drawn, molded, stamped, casted, or any combination thereof. For example, the one or more frame sections and/or bows may be formed of a single metal (e.g., aluminum) extrusion. As another example, the one or more frame sections and/or bows may be formed of an injection-molded polymer. The one or more frame sections and/or bows may have a shaped cross-sectional profile along its longitudinal axis. The cross-sectional profile may be circular, ovoid, square, rectangular, the like, or a combination thereof. The one or more frame sections and/or bows may be solid, hollow, or a combination of both (e.g., partially hollow). Being hollow may provide for reduced weight of the one or more frame sections and/or bows. The one or more frame sections and/or bows may include opposing ends. The opposing ends may be longitudinally distal ends of the one or more frame sections and/or bows. The opposing ends may provide a region for the one or more connectors or insert members to connect to the frame sections and/or bows. A length of a crossbow member may be approximately equal to, smaller than, or greater than, a width of a tonneau cover, cargo area, or both.

One or more connectors may be used to connect together adjacent frame elements and/or bows. The one or more connectors may be free of any mechanical fasteners (screws, bolts, etc.) that may require hand tools and/or power tools to assemble or disassemble. The one or more connectors (hinge connector, bow connector, corner connector) may be engaged or disengaged by a simple click- or push-fitting. The connectors may be engaged by a linear movement into an end of the frame section. The connectors may be engaged by a slight rotational movement into an end of the frame section and/or to engage a clip in the case of a bow connector. The one or more connectors may be formed from a plastic, metal, and/or composite material. The one or more connectors may be formed without the use of additional fasteners like screws, rivets, etc.

These teachings make reference to the advantageous design that does not require any hand tools or power tools to assemble the frame or cover system. This means, that a user or technician does not need to rely on any tools such as a screwdriver, hammer, drill, torch, welding apparatus, knife, socket, Allen wrench, Torx driver, to assemble the frame. This means a user or technician can assemble the frame in a structurally sound manner without using any power of hand tools. Structurally sound means that the frame can be assembled as intended by the frame supplier without the frame or cover falling apart or failing due to non-use of tools.

It is understood that the following method steps can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a motor" does not limit the teachings to a single motor. Instead, for example, disclosure of "a motor" may include "one or more motors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be or not be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

The invention claimed is:

1. A cover system configured for a cargo area of a vehicle, the cover system comprising: a frame comprising a first frame section and a second frame section that opposes the first frame section;

a bow connector connected to the first frame section; and a bow that extends between the first frame section and the second frame section, the bow comprises a receiver that is configured to engage the bow connector to connect the bow to the first frame section, wherein the bow connector comprises a wedge-shaped structure that is configured to engage a corresponding structure on the receiver of the bow to connect the bow to the first frame section;

wherein the wedge-shaped structure of the bow connector comprises a pair of ramp surfaces;

wherein the pair of ramp surfaces of the bow connector converge towards each other; and wherein one or both of the ramp surfaces of the bow connector comprise a distal end having an upwardly turned wall.

2. A cover system configured for a cargo area of a vehicle, the cover system comprising: a frame comprising a first frame section and a second frame section that opposes the first frame section;

a bow connector connected to the first frame section; and a bow that extends between the first frame section and the second frame section, the bow comprises a receiver that is configured to engage the bow connector to connect the bow to the first frame section, wherein the bow connector comprises a wedge-shaped structure that is configured to engage a corresponding structure on the receiver of the bow to connect the bow to the first frame section;

wherein the wedge-shaped structure of the bow connector comprises a pair of ramp surfaces; and wherein one or both of the pair of ramp surfaces of the bow connector are configured to bend, deflect, or flex towards each other, while the bow engages the bow connector.

3. The cover system according to claim 2, wherein after the receiver of the bow engages the bow connector, the one or both of the pair of ramp surfaces of the bow connector are configured to bend, deflect, or flex away from each other.

4. The cover system according to claim 3, wherein one or both of the ramp surfaces of the bow connector comprise a distal end having an upwardly turned wall.

5. The cover system according to claim 1, wherein the corresponding structure of the receiver comprises a pair of ramp surfaces.

6. The cover system according to claim 5, wherein the pair of ramp surfaces of the corresponding structure of the receiver converge towards each other.

7. A cover system configured for a cargo area of a vehicle, the cover system comprising: a frame comprising a first frame section and a second frame section that opposes the first frame section;

a bow connector connected to the first frame section; and a bow that extends between the first frame section and the second frame section, the bow comprises a receiver that is configured to engage the bow connector to connect the bow to the first frame section, wherein the bow connector comprises a wedge-shaped structure that is configured to engage a corresponding structure on the receiver of the bow to connect the bow to the first frame section;

wherein the wedge-shaped structure of the bow connector comprises a pair of ramp surfaces;

wherein the pair of ramp surfaces of the bow connector converge towards each other;

wherein the corresponding structure of the receiver comprises a pair of ramp surfaces; and wherein the pair of ramp surfaces of the bow connector are longer than the pair of ramp surfaces of the receiver so that after engagement of the bow connector and the receiver, a distal end of one or both of the ramp surfaces of the bow connector extend beyond one or both of the pair of ramp surfaces of the receiver.

8. The cover system according to claim 7, wherein the receiver comprises an engagement member that is configured to be received into or engage an opening defined in an end of the bow.

9. The cover system according to claim 1, wherein the bow connector comprises an engagement plate that is configured to engage a channel on the first frame section.

10. The cover system according to claim 9, wherein the channel extends along a length of the first frame section, which extends along a length of a bed wall of the cargo area.

11. The cover system according to claim 10, wherein the channel comprises a pair of opposing fingers or tabs.

12. The cover system according to claim 11, wherein the cover system comprises one or more fasteners that secure the engagement plate to the first frame section.

13. The cover system according to claim 8, wherein the bow connector is a first bow connector, the receiver is a first receiver, the cover system comprises a second bow connector having a wedge-shaped structure that is connected to the second frame section, in a generally opposing position relative to the first bow connector, the bow comprises a second receiver that is configured to engage the second bow connector to connect the bow to the second frame section.

14. The cover system according to claim 13, wherein the wedge-shaped structure of the second bow connector comprises a pair of ramp surfaces, one or both of which are configured to bend, deflect, or flex towards each other while the second receiver engages the second bow connector; and wherein after the second receiver engages the second bow connector, the one or both of the pair of ramp surfaces of the second bow connector are configured to bend, deflect, or flex away from each other.

15. The cover system according to claim 14, wherein the pair of ramp surfaces of the second bow connector are longer than the pair of ramp surfaces of the second receiver so that after engagement of the second bow connector and the second receiver, a distal end of one or both of the ramp surfaces of the second bow connector extend beyond one or both of the pair of ramp surfaces of the second receiver.

16. The cover system according to claim 15, wherein the second receiver is configured to disengage the second bow connector by biasing the pair of ramp surfaces towards each other and then sliding the receiver down the pair of ramp surfaces.

17. The cover system according to claim 16, wherein the second bow connector comprises a second engagement plate that is configured to engage a channel on the second frame section.

* * * * *